United States Patent
Matsumoto et al.

(10) Patent No.: US 9,967,502 B2
(45) Date of Patent: May 8, 2018

(54) SOLID-STATE IMAGE PICKUP DEVICE WITH COLUMNS CLUSTERED INTO GROUPS

(71) Applicant: Renesas Electronics Corporation, Tokyo (JP)

(72) Inventors: Osamu Matsumoto, Tokyo (JP); Fukashi Morishita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days. days.

(21) Appl. No.: 14/961,603

(22) Filed: Dec. 7, 2015

(65) Prior Publication Data

US 2016/0249005 A1 Aug. 25, 2016

(30) Foreign Application Priority Data

Feb. 24, 2015 (JP) .................................. 2015-033701

(51) Int. Cl.
*H04N 5/378* (2011.01)
*H04N 5/365* (2011.01)

(52) U.S. Cl.
CPC ........... *H04N 5/378* (2013.01); *H04N 5/3658* (2013.01)

(58) Field of Classification Search
CPC .............................. H04N 5/378; H04N 5/3658
See application file for complete search history.

(56) References Cited

U.S. PATENT DOCUMENTS

| | | | |
|---|---|---|---|
| 6,784,928 B1* | 8/2004 | Sakurai | H04N 3/1562 250/208.1 |
| 9,001,249 B2 | 4/2015 | Iwane | |
| 9,148,596 B1* | 9/2015 | Sun | H04N 5/3698 |
| 2009/0159784 A1* | 6/2009 | Kobayashi | H03F 3/08 250/208.1 |
| 2009/0303340 A1* | 12/2009 | Itano | H04N 5/3651 348/222.1 |
| 2014/0160331 A1* | 6/2014 | Murakami | H04N 5/378 348/300 |
| 2015/0244332 A1* | 8/2015 | Gendai | H03F 3/082 348/300 |
| 2015/0271424 A1* | 9/2015 | Yamaoka | H04N 5/378 348/300 |
| 2015/0326804 A1* | 11/2015 | Lee | H04N 5/378 348/308 |

FOREIGN PATENT DOCUMENTS

JP 2012-253691 A 12/2012

* cited by examiner

*Primary Examiner* — Albert Cutler
(74) *Attorney, Agent, or Firm* — McGinn IP Law Group, PLLC

(57) ABSTRACT

In a CMOS image sensor, a plurality of bias circuits are dispersedly arranged in an arrangement region of column circuits corresponding to each column of a pixel array. Each bias circuit generates a bias voltage on the basis of a reference current which has been input and supplies the generated bias voltage to the corresponding column circuit 10 which is arranged in the vicinity. Thereby, luminance unevenness of a picked-up image caused by an IR drop of a ground wire for the column circuits is reduced.

15 Claims, 17 Drawing Sheets

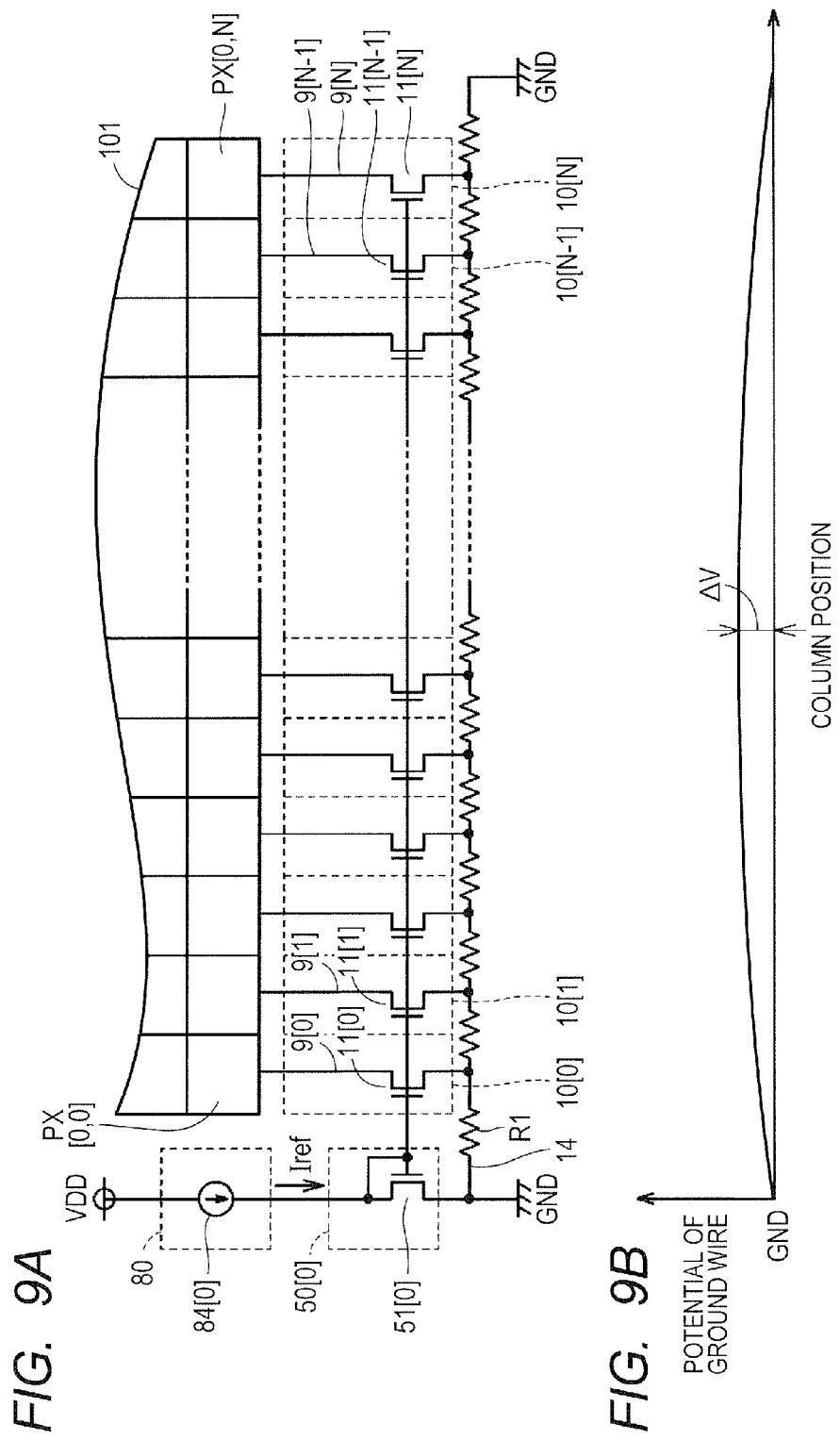

SOLID-STATE IMAGE PICKUP DEVICE WITH COLUMNS CLUSTERED INTO GROUPS

CROSS-REFERENCE TO RELATED APPLICATIONS

The disclosure of Japanese Patent Application No. 2015-033701 filed on Feb. 24, 2015 including the specification, drawings and abstract is incorporated herein by reference in its entirety.

BACKGROUND

The present invention relates to a solid-state image pickup device and relates to a column circuit which is provided corresponding to, for example, each column of a pixel array.

The solid-state image pickup device (also called an image sensor) includes the pixel array that a plurality of pixels are arrayed in a matrix. A vertical signal line is provided corresponding to each column of the pixel array. In case of a CMOS (Complementary Metal Oxide Semiconductor) image sensor, each pixel includes at least one photoelectric conversion element and an amplification transistor which outputs an electric signal according to charges stored in the photoelectric conversion element to the vertical signal line.

In the CMOS image sensor, the column circuits are provided respectively corresponding to the columns of the pixel array. Each column circuit is provided with a current source transistor for defining a current flowing through the corresponding vertical signal line. A source follower circuit is configured by the current source transistor and the amplification transistor of each pixel. A bias voltage is applied from a common bias circuit to a control electrode of each current source transistor (see, for example, Japanese Unexamined Patent Application Publication No. 2012-253691).

SUMMARY

In general, the solid-state image pickup device is provided with several hundred to several thousand column circuits. Since these column circuits share one ground wire, the electric signals which have been output from the respective pixels flow into the common ground wire when pixel data is to be read out. Since an IR drop occurs in the ground wire due to flowing of the electric signals into the common ground wire, circuit characteristics of a peripheral column circuit which is located close to a ground potential supply source and a central column circuit are made different from each other. Consequently, luminance unevenness (so-called shading) is generated in a picked-up image.

Other subjects and novel features of the present invention will become apparent from description of the specification and the appended drawings.

In a CMOS image sensor according to one embodiment, a plurality of bias circuits are dispersedly arranged in an arrangement region of column circuits corresponding to respective columns of a pixel array. Each bias circuit generates a bias voltage on the basis of a reference current which has been input and supplies the generated bias voltage to the corresponding column circuit which is arranged in the vicinity.

According to the CMOS image sensor of the above-mentioned embodiment, it is possible to reduce the luminance unevenness of the picked-up image caused by the IR drop of the ground wire used for the column circuits.

BRIEF DESCRIPTION OF THE DRAWINGS

FIG. 9A is a diagram illustrating a comparative example of the configuration in FIG. 8, that is, illustrating a circuit diagram.

FIG. 9B is a diagram illustrating the comparative example of the configuration in FIG. 8, that is, illustrating one example of a potential distribution of the ground wire 14 in the circuit diagram in FIG. 9A.

DETAILED DESCRIPTION

Figure 1:
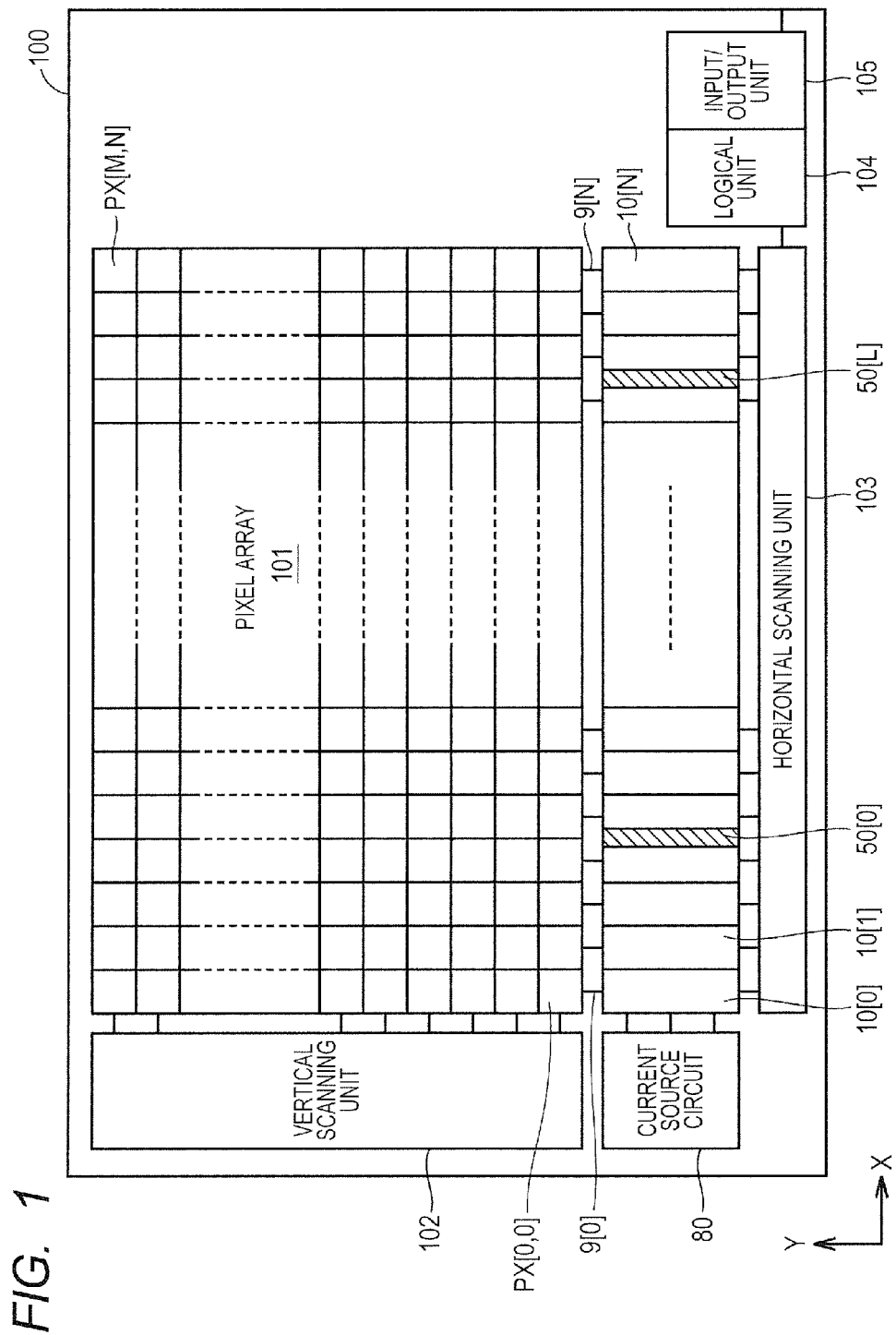
FIG. 1 is a block diagram illustrating one example of a configuration of a CMOS image sensor according to a first embodiment.

In the following, preferred embodiments of the present invention will be described in detail with reference to the drawings. Incidentally, the same reference numerals are assigned to the same or corresponding parts and repetitive description thereof is omitted.

First Embodiment

Configuration of Image Sensor

FIG. 1 is a block diagram illustrating one example of a configuration of a CMOS image sensor according to the first embodiment. A CMOS image sensor 100 includes a pixel array 101, a vertical scanning unit 102, the column circuits 10[0] to 10[N], a horizontal scanning unit 103, a logical unit 104, an input/output unit 105, the bias circuits 50[0] to 50[L], the current source circuit 80 and so forth.

When FIG. 1 is referred to, the pixel array 101 includes a plurality of pixels PX which are arrayed in a matrix. Specifically, the pixel array 101 includes M+1 rows and N+1 columns. Accordingly, (M+1)×(N+1) pixels PX in all are arrayed. For example, in case of a definition of full HD (Full High Definition), M+1=1080 pixels PX in row and N+1=1920 pixels PX in column.

Incidentally, in the following description, a pixel in a 0-th row and a 0-th column will be expressed as PX[0,0], a pixel in an i-th row and a j-th column will be expressed as PX[i,j] and a pixel in an M-th row and an N-th column will be expressed as PX[M,N]. A row direction of the pixel array 101 will be referred to as an X direction or a horizontal direction and a column direction of the pixel array 101 will be referred to as a Y direction or a vertical direction.

Figure 2:
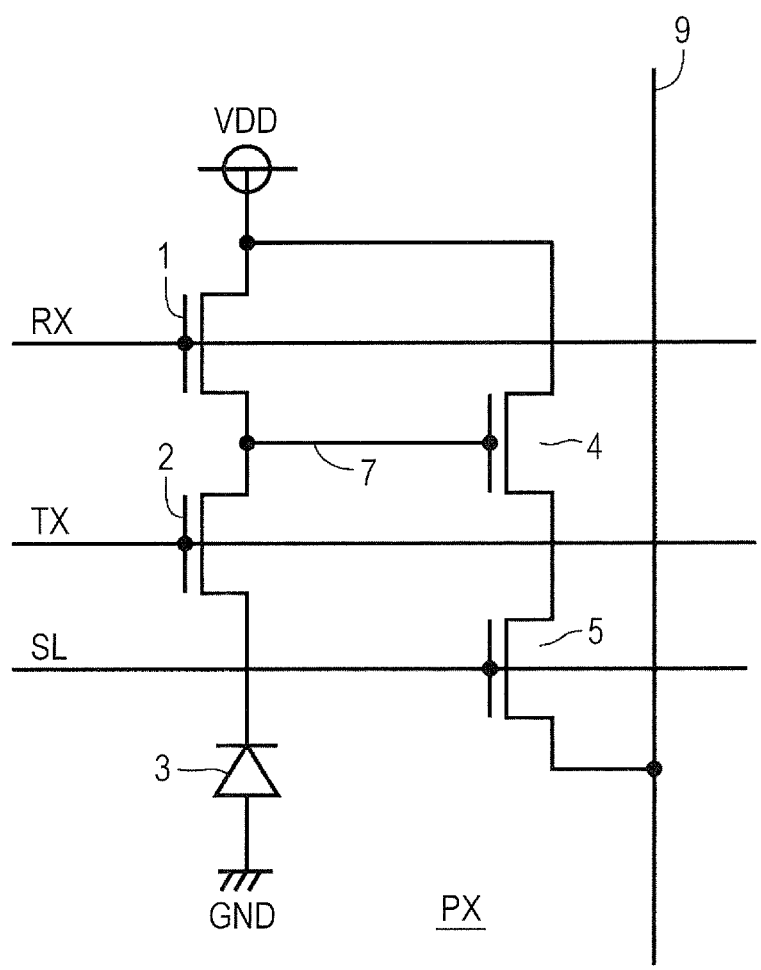
FIG. 2 is an equivalent circuit diagram illustrating one example of a configuration of each pixel in FIG. 1.

FIG. 2 is an equivalent circuit diagram illustrating one example of a configuration of each pixel in FIG. 1. When FIG. 2 is referred to, each pixel PX includes a photodiode (a photoelectric conversion element) 3 which converts an optical signal into an electric signal, a transfer transistor 2 which transfers the electric signal which has been generated by the photodiode 3 to a floating diffusion amplifier 7, a reset transistor 1 which resets a voltage level of the floating diffusion amplifier 7 to a predetermined voltage level (a power source potential VDD level) and so forth. Each pixel PX further includes an amplification transistor 4 which transfers the electric signal on the floating diffusion amplifier 7 in a source follower mode, a selection transistor 5 which transfers the electric signal which has been transferred from the amplification transistor 4 onto a vertical signal line 9 and so forth. In case of the CMOS image sensor, each of the transistors 1, 2, 4 and 5 is configured by an NMOS (N-channel MOS) transistor.

Figure 3:
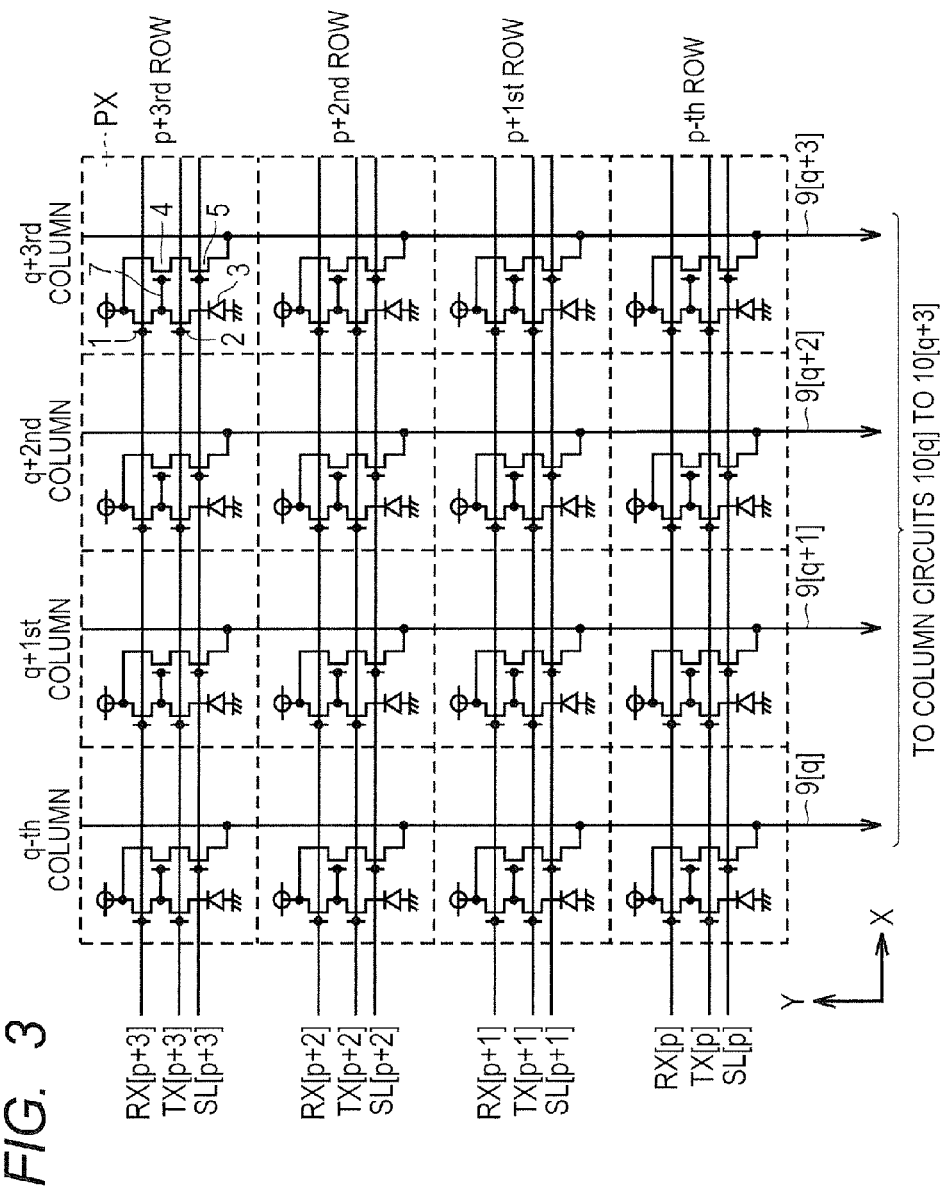
FIG. 3 is a circuit diagram illustrating one example of part which has been taken out of a pixel array in FIG. 1.

FIG. 3 is a circuit diagram illustrating one example of a configuration of part which has been taken out of the pixel array in FIG. 1. In FIG. 3, sixteen pixels PX which are arranged in the rows ranging from a p-th row to a p+3rd row and in the columns ranging from a q-th column to a q+3rd column are illustrated. As illustrated in FIG. 3, horizontal signal lines TX, RX and SL are provided respectively corresponding to each row of the pixel array and the vertical signal line 9 is provided corresponding to each column of the pixel array. Gates of the transfer transistors 2 of the respective pixels PX which are provided in the same row are coupled to the corresponding horizontal signal line TX which extends in the row direction. Gates of the reset transistors 1 of the respective pixels PX which are provided in the same row are coupled to the corresponding horizontal signal line RX which extends in the row direction. Gates of the selection transistors 5 of the respective pixels PX which are provided in the same row are coupled to the corresponding horizontal signal line SL which extends in the row direction. Sources of the selection transistors 5 of the respective pixels PX which are provided in the same column are coupled to the corresponding vertical signal line 9 which extends in the column direction.

Reading-out of data stored in the photodiodes of the respective pixels PX is sequentially performed row by row. For example, when data in the respective pixels PX in the p-th row are to be read out, first, the voltage of a horizontal signal line SL[p] is set to a high (H) level (that is, the selection transistor 5 is turned on) in a state where the voltage of a horizontal signal line TX[p] is at a low (L) level (that is, the transfer transistor 2 is in an off-state). Further, the charge in the floating diffusion amplifier 7 is reset by setting the voltage of a horizontal signal line RX[p] to the H level (that is, the reset transistor 1 is turned on).

Next, the voltage of the horizontal signal line RX[p] is set to the L level (that is, the reset transistor 1 is turned off) and a potential (a dark signal) of the floating diffusion amplifier 7 which is obtained at that time is read out via the vertical signal line 9.

Next, the charges stored in the photodiode 3 are transferred to the floating diffusion amplifier 7 in accordance with the optical signal by setting the voltage of the horizontal signal line TX[p] to the H level (that is, turning the transfer transistor 2 on). Then, the potential (a bright signal) of the floating diffusion amplifier 7 which is obtained at that time is read out via the vertical signal line 9.

Incidentally, although in the examples in FIG. 2 and FIG. 3, one pixel PX is provided with one photodiode 3 and one transfer transistor 2, a configuration that each pixel PX is provided with a plurality of the photodiodes 3 and a plurality of the transfer transistors 2 is also possible.

When FIG. 1 is again referred to, the vertical scanning unit 102 scans the pixels PX in the vertical direction (the Y direction). Specifically, the vertical scanning unit 102 controls the voltages of the horizontal signal lines TX, RX and SL which have been described with reference to FIG. 2 and FIG. 3.

N+1 column circuits 10[0] to 10[N] (when they are to be generally referred to or when an unspecific one of them is to be referred to, it is expressed as the column circuit 10) are provided respectively corresponding to the columns of the pixel array 101. Each column circuit 10 is coupled with the vertical signal line 9 of the corresponding column and fetches the electric signal (the dark signal and the bright signal) output from the pixels PX in the corresponding column. Each column circuit 10 amplifies the fetched electric signal and performs AD (analog-to-digital) conversion on the amplified electric signal. In case of the example in FIG. 1, the column circuits 10[0] to 10[N] are arrayed in the row direction (the X direction) along a lower side of the pixel array 101.

The horizontal scanning unit 103 transfers in parallel N+1 digital signals which have been respectively output from the column circuits 10[0] to 10[N] in the horizontal direction (the X direction).

The logical unit 104 controls the operations of the entire CMOS image sensor 100 (that is, the vertical scanning unit 102, the column circuit 10, the horizontal scanning unit 103 and so forth) in accordance with a command which is given from the outside.

The input/output unit 105 converts the n+1 digital signals which have been transferred from the horizontal scanning unit 103 into serial signals by parallel-to-serial conversion and then outputs the serial signals to the outside of the CMOS image sensor 100. The input/output unit 105 further receives the command and so forth from the outside.

Each of the bias circuits 50[0] to 50[L] is a circuit for supplying bias voltages to the column circuits 10[0] to 10[N] (in the example in FIG. 1, the bias circuits 50[0] and 50[L] are hatched in order to facilitate illustration). Each bias circuit 50 generates the plurality of kinds of bias voltages on the basis of a reference current Iref which has been input into each bias circuit 50. Then, each bias circuit 50 is provided corresponding to some column circuits in the column circuits 10[0] to 10[N] and supplies the plurality of kinds of bias voltages so generated to the corresponding column circuits. The current source circuit 80 generates the reference current to be supplied to each bias circuit 50.

For example, in case of the CMOS image sensor of the definition of the full HD, the bias circuits 50 of the number amounting to L+1=about 5 to about 20 are provided corresponding to the column circuits 10[0] to 10[1919] of the number amounting to N+1=about 1920. In this case, about 100 to about 400 column circuits 10 are provided corresponding to each bias circuit 50. In a typical example, the bias circuits 50 are dispersedly arranged in an array of the column circuits 10 as illustrated in FIG. 1.

[Details of Column Circuit]

Figure 4:
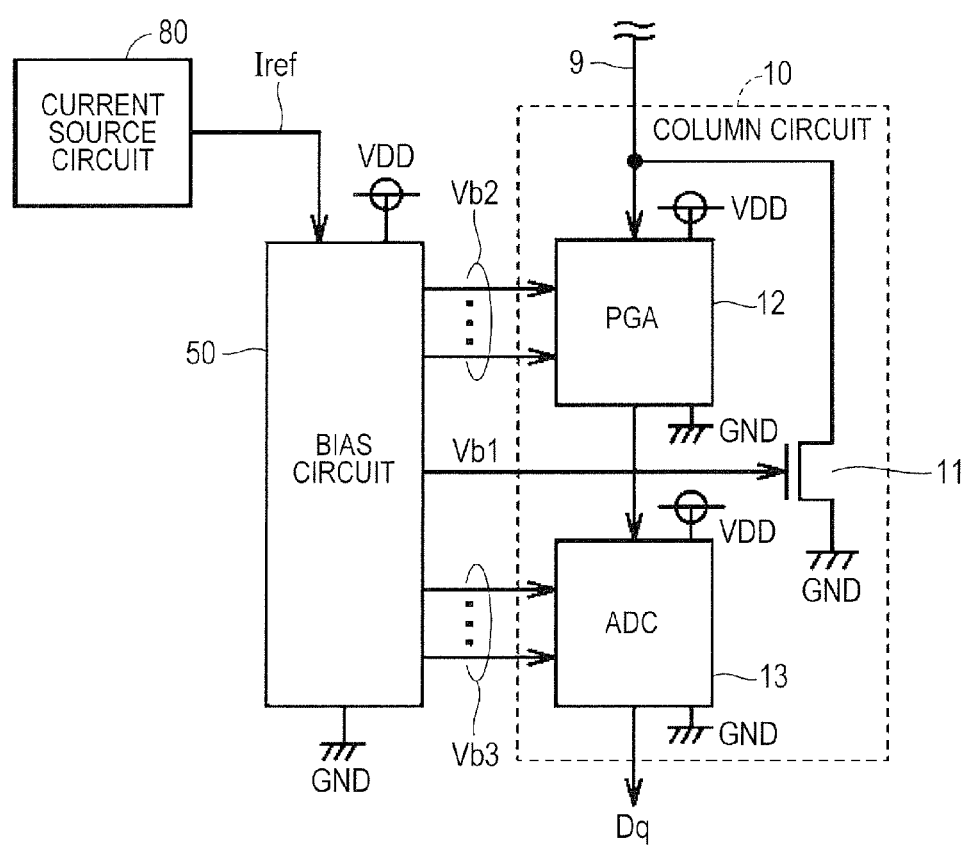
FIG. 4 is a block diagram illustrating one example of a more detailed configurational of a column circuit 10 in FIG. 1.

FIG. 4 is a block diagram illustrating one example of a more detailed configuration of the column circuit 10 in FIG. 1. In the example in FIG. 4, the bias circuit 50 corresponding to the column circuit 10 is illustrated together with the current source circuit 80.

Each column circuit 10 includes an NMOS transistor 11 (hereinafter, also referred to as a constant current transistor 11) used as a constant current source, the programmable gain amplifier (PGA) 12, the AD converter (ADC: Analog-to-Digital Converter) 13 and so forth. The constant current transistor 11 is coupled between the corresponding vertical signal line 9 and a ground node for giving the ground potential GND. The PGA 12 amplifies the electric signal which has been output from each pixel PX in the corresponding column. The AD converter 13 converts the electric signal which has been amplified by the PGA into a digital signal Dq.

The bias circuit 50 receives the reference current Iref which has been generated by the current source circuit 80 and generates bias voltages Vb1, Vb2 and Vb3 on the basis of the reference current Iref. The bias voltage Vb1 is supplied to a gate of the constant current transistor 11. The plurality of bias voltages Vb2 are used in the PGA 12 and the plurality of bias voltages Vb3 are used in the ADC 13. Incidentally, the PGA 12, the ADC 13 and the bias circuit 50 operate by receiving the power source potential VDD and the ground potential GND which are commonly used among them.

Figure 5:
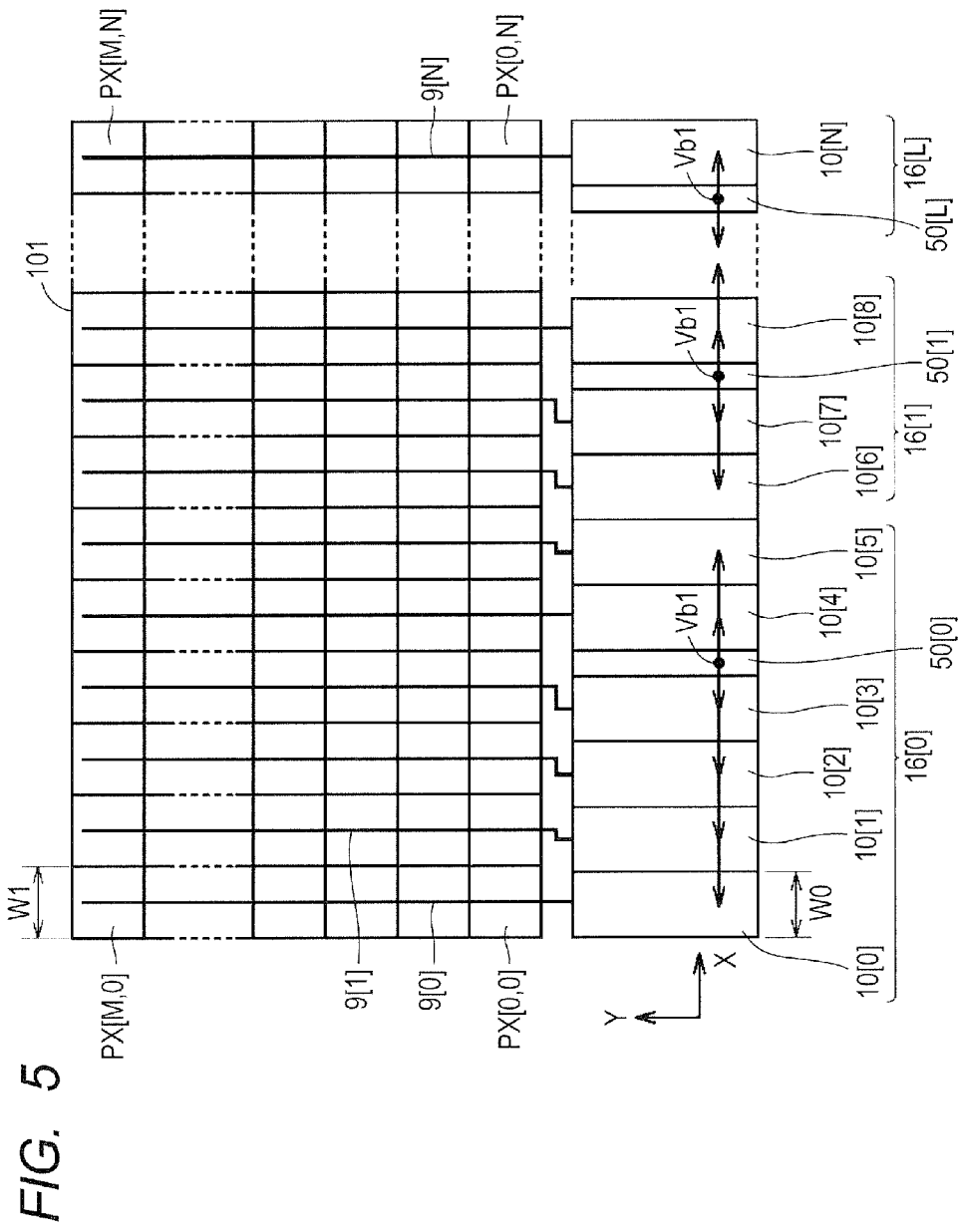
FIG. 5 is a circuit diagram illustrating one example of a corresponding relation between the column circuit 10 and a bias circuit 50.

FIG. 5 is a diagram illustrating one example of a corresponding relation between the column circuit 10 and the bias circuit 50. When FIG. 5 is referred to, the column circuits 10[0] to 10[N] are partitioned into L+1 groups 16 [0] to 16 [L]. Each group 16 includes the plurality of column circuits 10. The bias circuits 50[0] to 50[L] are provided respectively corresponding to the groups 16[0] to 16[L] and the bias voltages are supplied from the corresponding bias circuit 50 to the column circuits included in each corresponding group 16.

For example, in case of the example in FIG. 5, the 0-th to 5th column circuits 10[0] to 10[5] which are numbered in array order belong to the 0-th group 16 [0]. The bias voltage Vb1 is supplied from the bias circuit 50[0] to the respective column circuits 10 in the group 16[0]. The bias circuit 50[0] is arranged between the column circuit 10[3] and the column circuit 10[4].

Likewise, the 6th, 7th and 8th column circuits 10[6], 10[7] and 10[8] which are numbered in array order belong to the 1st group 16[1]. The bias voltage Vb1 is supplied from the bias circuit 50[1] to the respective column circuits 10 in the group 16 [1]. The bias circuit 50[1] is arranged between the column circuit 10[7] and the column circuit 10[8].

In this way, in case of the example in FIG. 5, each bias circuit 50 is arranged between the two adjacent column circuits 10 in an array of the plurality of column circuits 10 included in the corresponding group 16. Although not illustrated in FIG. 5, as an alternative, each bias circuit 50 may be arranged on an end side of the array of the plurality of column circuits 10 included in the corresponding group 16. In other words, each bias circuit 50 is provided adjacent to any of the column circuits belonging to the corresponding group 16.

Incidentally, in order to ensure an arrangement space for the bias circuits, it is desirable that a width (a length in the row direction) W0 of the column circuit 10 be made narrower than a width W1 of each column of the pixel array (that is, a row-direction pitch of the pixels).

[IR Drop]

Figure 6A:
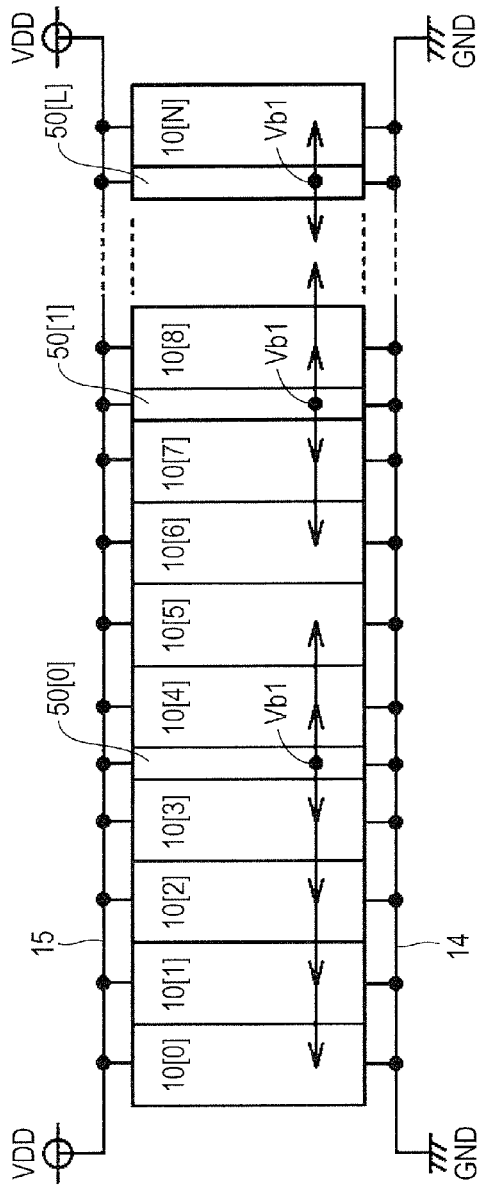
FIG. 6A is a diagram illustrating one example of supply of a power source potential VDD and a ground potential GND to each column circuit 10 and each bias circuit 50, that is, illustrating coupling relations between a ground wire and a power source wire and between each column circuit 10 and each bias circuit 50.
Figure 6B:
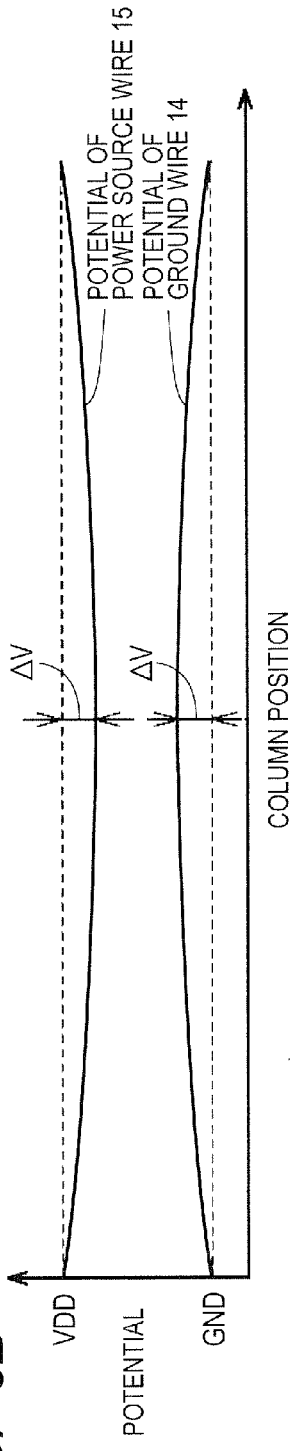
FIG. 6B is a diagram illustrating one example of supply of the power source potential VDD and the ground potential GRN to each column circuit 10 and each bias circuit 50, that is, illustrating one example of IR drops which would occur in the power source wire and the ground wire.

FIG. 6A is a diagram illustrating one example of supply of the power source potential VDD and the ground potential GND to each column circuit 10 and each bias circuit 50, that is, illustrating coupling relations between a ground wire 14 and a power source wire 15 and between each column circuit 10 and each bias circuit 50. FIG. 6B is a diagram illustrating one example of supply of the power source potential VDD and the ground potential GND to each column circuit 10 and each bias circuit 50, that is, illustrating one example of IR drops which would occur in the power source wire 15 and the ground wire 14. Incidentally, the power source potential VDD and the ground potential GND are also generally referred to as standard potentials VDD and GND, and the power source wire 15 and the ground wire 14 are also generally referred to as standard potential wires 15 and 14.

As illustrated in FIG. 6A, the column circuits 10[0] to 10[N] and the bias circuits 50[0] to 50[L] are coupled with the common ground wire 14 and the common power source wire 15 which respectively extend in the row direction of the pixel array. Both ends of the ground wire 14 are coupled with ground nodes which give the ground potential GND and both ends of the power source wire 15 are coupled with power source nodes which give the power source potential VDD.

As already described, each column circuit 10 is coupled with the corresponding vertical signal line and thereby a signal current flows into each column circuit 10 when reading out a pixel signal. Consequently, the IR drops occur in the ground wire 14 and the power source wire 15. Specifically, as illustrated in FIG. 6B, around the center of the ground wire 14, the potential is made higher than the ground potential GND at the both ends of the ground wire 14 by a ΔV. Around the center of the power source wire 15, the potential is made lower than the power source potential VDD at the both end of the power source wire by the ΔV.

In the CMOS image sensor 100 according to the present embodiment, in order to suppress the influence of such IR drops, the bias circuits 50[0] to 50[L] are dispersedly provided in an arrangement region of the column circuits 10[0] to 10[N]. More specifically, a coupling point between each bias circuit 50 and the ground wire 14 is located adjacent to a coupling point between any of the column circuits 10 belonging to the corresponding group 16 and the ground wire 14. In other words, the coupling point between each bias circuit 50 and the ground wire 14 is located between any two coupling points in the plurality of coupling points between the plurality of the column circuits 10 belonging to the corresponding group 16 and the ground wire 14 or is located adjacent to each of both ends of a set of the plurality of coupling points between the plurality of the column circuits 10 and the ground wire 14.

Likewise, a coupling point between each bias circuit 50 and the power source wire 15 is located adjacent to a coupling point between any of the column circuits 10 belonging to the corresponding group 16 and the power source wire 15. In other words, the coupling point between each bias circuit 50 and the power source wire 15 is located between any two adjacent coupling points in the plurality of the coupling points between the plurality of the column circuits 10 belonging to the corresponding group 16 and the power source wire 15 or is located adjacent to each of both ends of a set of the plurality of coupling points between the plurality of the column circuits 10 and the power source wire 15.

In the following, disadvantages of the IR drops and countermeasures against the IR drops will be described in more detail, taking an error in gate-to-source voltage of the constant current transistor 11 provided in each column circuit 10 by way of example. First, a configuration of the current source circuit 80 in FIG. 1 for generating the reference current Iref on the basis of which the bias voltages are generated will be described.

Figure 7:
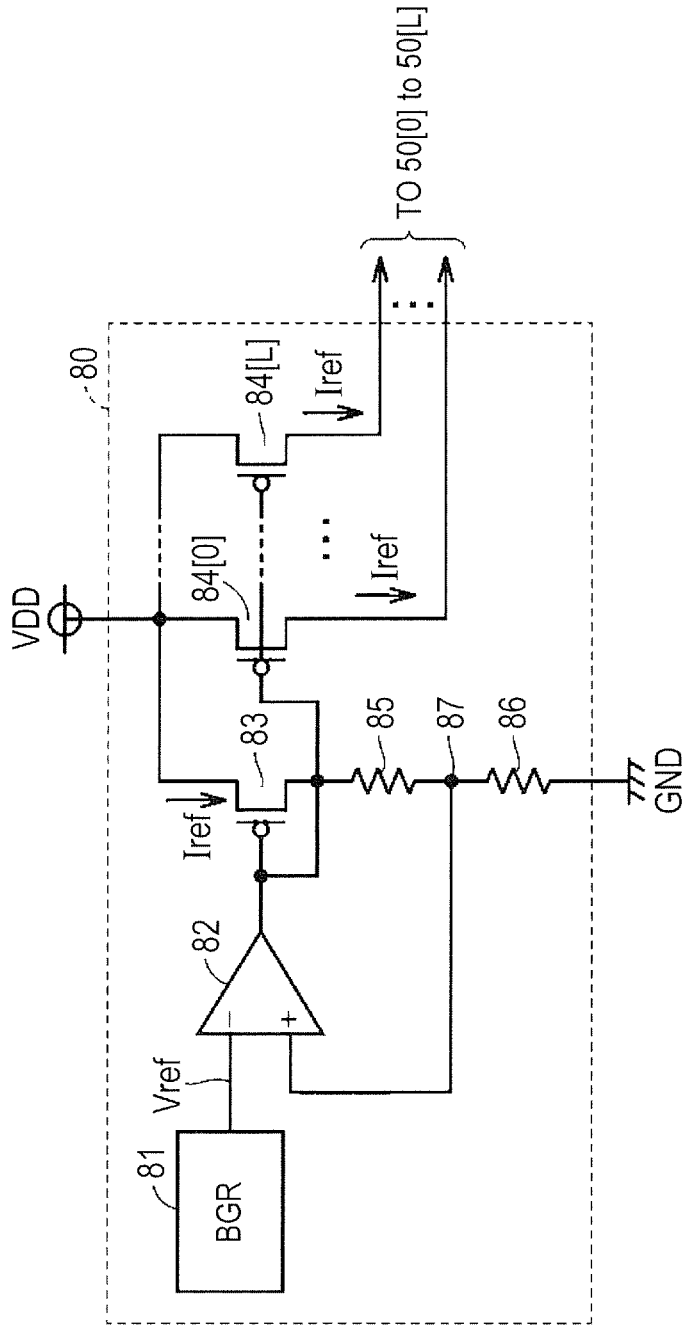
FIG. 7 is a circuit diagram illustrating one example of a configuration of a current source circuit 80 in FIG. 1.

FIG. 7 is a circuit diagram illustrating one example of a configuration of the current source circuit 80 in FIG. 1. When FIG. 7 is referred to, the current source circuit 80 includes a band-gap reference (BGR) circuit 81, a comparator 82, PMOS (P-channel MOS) transistors 83 and 84[0] to 84[L], resistance elements 85 and 86 and so forth.

The band-gap reference circuit 81 generates a constant reference voltage Vref (in general, around 1.25 V) which hardly depends on a fluctuation in power source potential VDD and a temperature fluctuation. The generated reference voltage Vref is input into an inverted input terminal (a negative input terminal) of the comparator 82. The PMOS transistor 83 and the resistance elements 85 and 86 are serially coupled between the power source node (the power source potential VDD) and the ground node (the ground potential GND). It is desirable to use a material the resistance value of which hardly depends on the temperature such as, for example, polysilicon and so forth as the material of the resistance elements 85 and 86. A coupling node 87 between the resistance elements 85 and 86 is coupled to a non-inverted input terminal (a positive input terminal) of the comparator 82. The potential of the coupling node 87 is fed back to the comparator 82 and thereby the constant reference current Iref which hardly depends on the fluctuation in power source potential VDD and the temperature fluctuation flows into the PMOS transistor 83.

The PMOS transistors 84[0] to 84[L] configure a current mirror (or a current mirror circuit) together with the PMOS transistor 83. Thereby, a current according to a mirror ratio flows into each of the PMOS transistors 84[0] to 84[L]. Since in the example in FIG. 7, the mirror ratio is set to 1, the reference current Iref flows into each of the PMOS transistors 84 [0] to 84 [L]. The reference current Iref is supplied from each of the PMOS transistors 84 [0] to 84 [L] to each of the bias circuits 50[0] to 50[L].

Figure 8A:
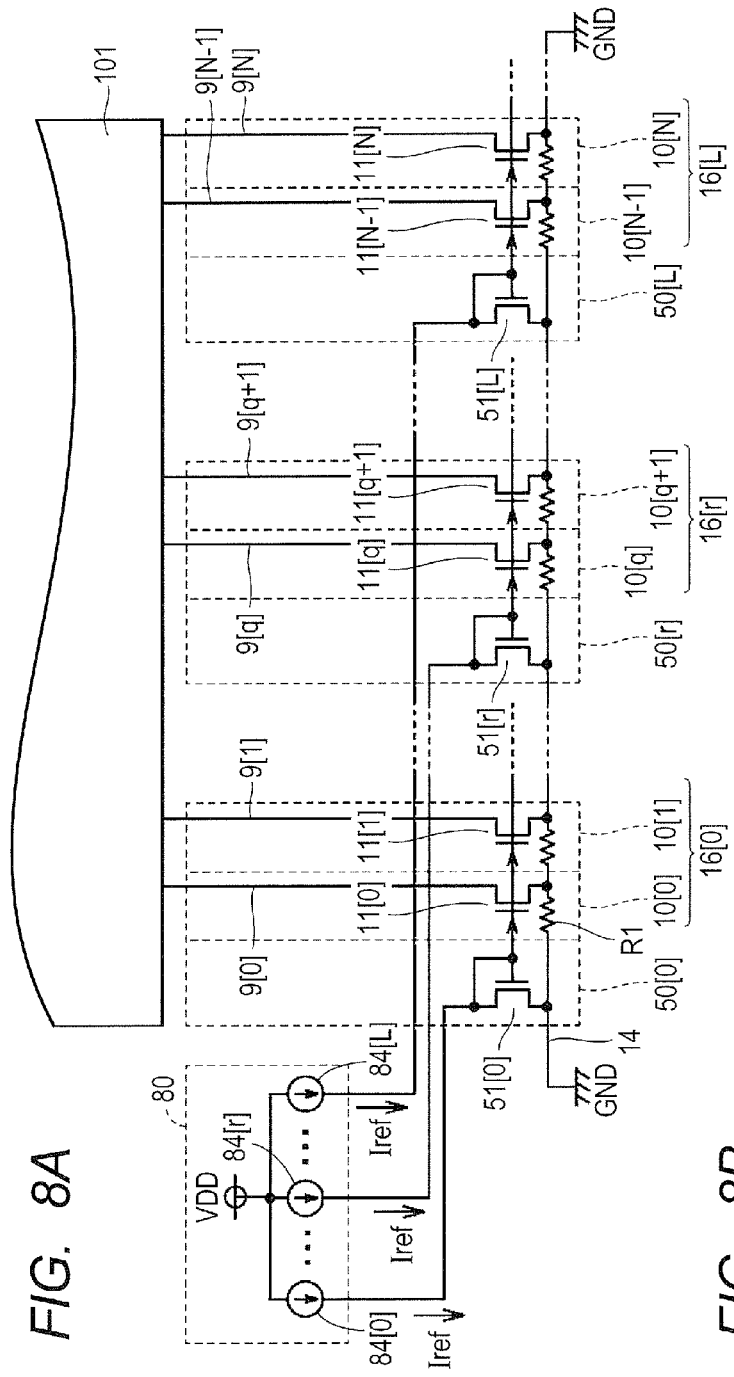
FIG. 8A is a diagram illustrating one example of coupling between each bias circuit 50 and a constant current transistor 11 provided in the corresponding column circuit 10, that is, illustrating a circuit diagram of the respective circuits.
Figure 8B:
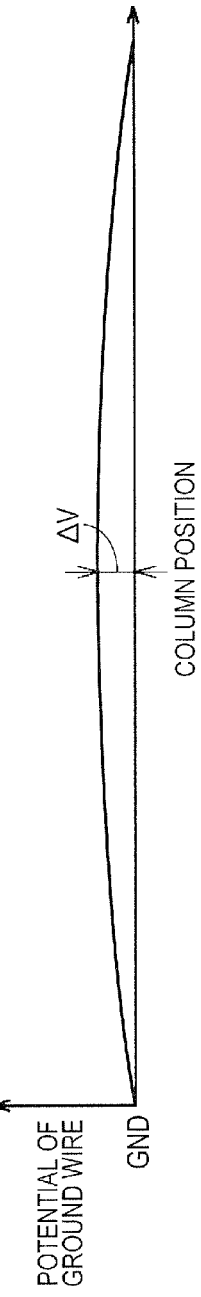
FIG. 8B is a diagram illustrating one example of coupling between each bias circuit 50 and the constant current transistor 11 provided in the corresponding column circuit 10, that is, illustrating one example of a potential distribution of the ground wire 14 in the circuit diagram in FIG. 8A.

FIG. 8A is a diagram illustrating one example of coupling between each bias circuit 50 and the constant current transistor 11 provided in the corresponding column circuit 10, that is, illustrating a circuit diagram of them. FIG. 8B is a diagram illustrating one example of coupling between each bias circuit 50 and the constant current transistor 11 provided in the corresponding column circuit 10, that is, illustrating one example of a potential distribution of the ground wire 14 in the circuit diagram in FIG. 8A.

When FIG. 8A is referred to, each of the bias circuits 50[0] to 50[L] includes each of the NMOS transistors 51[0] to 51[L]. A source of each of the NMOS transistors 51[0] to 51[L] is coupled with the ground wire 14. A drain of each of the NMOS transistors 51[0] to 51[L] is coupled with a drain of each of the PMOS transistors 84 [0] to 84 [L] of the current source circuit 80 which has been described with reference to FIG. 7. Thereby, the reference current Iref flows into the NMOS transistor 51 in each bias circuit 50.

A gate of each NMOS transistor 51 is coupled to a drain of itself and is coupled to a gate of each constant current transistor 11 included in the corresponding group 16. That is, the PMOS transistor 51 provided in each bias circuit 50 configures the current mirror together with each constant current transistor 11 in the corresponding group 16. For example, a NMOS transistor 51[$r$] (wherein, 0≤r≤L) provided in a bias circuit 50[$r$] configures the current mirror circuit together with constant current transistors 11[$q$] and 11[$q+1$] of column circuits 10[$q$] and 10[$q+1$] belonging to a corresponding group 16[$r$] (wherein, 0≤q and q+1≤N).

FIG. 9A is a diagram illustrating a comparative example of the configuration in FIG. 8, that is, illustrating a circuit diagram. FIG. 9B is a diagram illustrating the comparative example of the configuration in FIG. 8, that is, illustrating one example of a potential distribution of the ground wire 14 in the circuit diagram in FIG. 9A.

In the comparative example in FIG. 9A, only one bias circuit 50[0] is provided. A source of the NMOS transistor 51[0] provided in the bias circuit 50[0] is coupled to one end of the ground wire 14. That is, the bias circuit 50[0] is provided on an end side of the array of the column circuits 10[0] to 10[N]. A drain of the NMOS transistor 51[0] is coupled with a drain of the PMOS transistor 84[0] of the current source circuit 80 which has been described with reference to FIG. 7. Thereby, the reference current Iref flows into the NMOS transistor 51[0] provided in the bias circuit 50[0].

The NMOS transistor 51[0] provided in the bias circuit 50[0] configures the current mirror together with the NMOS transistors 11[0] to 11[N]. Thereby, when the mirror ratio is 1, it is expected that the reference current Iref will flow also into the NMOS transistors 11[0] to 11[N]. However, such a situation does not happen in reality. The reason therefor is that since the IR drop occurs in the ground wire 14 by a resistor R1 as illustrated in FIG. 9B, the gate-to-source voltage of each constant current transistor 11 does not become equal to the gate-to-source voltage of the NMOS transistor 51. Specifically, around the center of the array of the column circuits 10, the gate-to-source voltage of the constant current transistor 11 is reduced by the amount corresponding to the voltage rise amount ΔV of the ground wire 14. Consequently, the current which flows into the constant current transistor 11 is reduced and luminance unevenness (that is, shading) is generated in the CMOS image sensor.

Also, in case of the present embodiment, as illustrated in FIG. 8B, the potential distribution caused by the IR drop is generated in the ground wire 14. This point is the same as the case of the comparative example in FIG. 9. However, as illustrated in FIG. 8A, the bias circuits 50[0] to 50[L] are dispersedly arranged in the arrangement region of the column circuits 10[0] to 10[L]. That is, the column circuit 10 belonging to each group 16 is provided at a position which is comparatively close to the corresponding bias circuit 50. Therefore, a difference between the gate-to-source voltage of the NMOS transistor 11 of each column circuit 10 in each column circuit 10 and the gate-to-source voltage of the NMOS transistor 51 in the corresponding bias circuit 50 is smaller than that of the comparative example in FIG. 9. Consequently, the reference current Iref which has been applied from the current source circuit 80 to each bias circuit 50 is copied to the corresponding column circuit 10 by the current mirror almost accurately and thereby it becomes possible to improve evenness of the current flowing into the constant current transistor 11 in each column circuit 10.

Incidentally, the current mirror circuits in FIG. 8 and FIG. 9 may be configured by cascode current mirrors and may be configured by low-voltage cascode current mirrors.

[Configurational Example of PGA and Supply of Bias Voltages]

Each of the bias circuits 50 further generates the bias voltages to be supplied to the PGA 12 in the corresponding column circuit 10. Thereby, it is possible to reduce position dependency of a read-out current and it is also possible to reduce the position dependency of circuit characteristics of the PGA 12. In the following, description will be specifically made with reference to the drawings.

Figure 10:
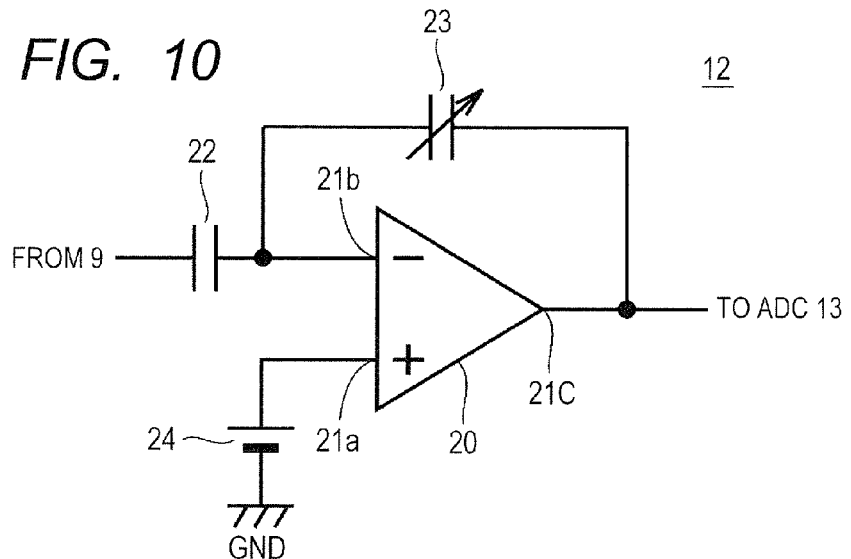
FIG. 10 is a circuit diagram illustrating one example of a configuration of a PGA 12 in FIG. 4.

FIG. 10 is a circuit diagram illustrating one example of a configuration of the PGA 12 in FIG. 4. When FIG. 10 is referred to, the PGA 12 includes an input capacitance 22, a feedback capacitance 23, an operational amplifier 20 and so forth.

A reference voltage source 24 is coupled to a positive input terminal 21 of the operational amplifier 20. One end of the input capacitance 22 is coupled with the corresponding vertical signal line 9 and the other end of the input capacitance 22 is coupled with a negative input terminal 21b of the operation amplifier 20. The feedback capacitance 23 is coupled between the negative input terminal 21b and an output terminal 21c of the operational amplifier 20.

A gain of the operational amplifier 20 is determined in accordance with a ratio of a value of the input capacitance 22 to a value of the feedback capacitance 23. An output signal from the pixel PX which has been applied to one end of the input capacitance 22 is amplified by the operational amplifier 20 and then is output to the ADC 13. In case of the example in FIG. 10, gain adjustment of the operational amplifier 20 is performed by changing the value of the feedback capacitance 23. As an alternative, the value of the input capacitance 22 may be changed.

Figure 11:
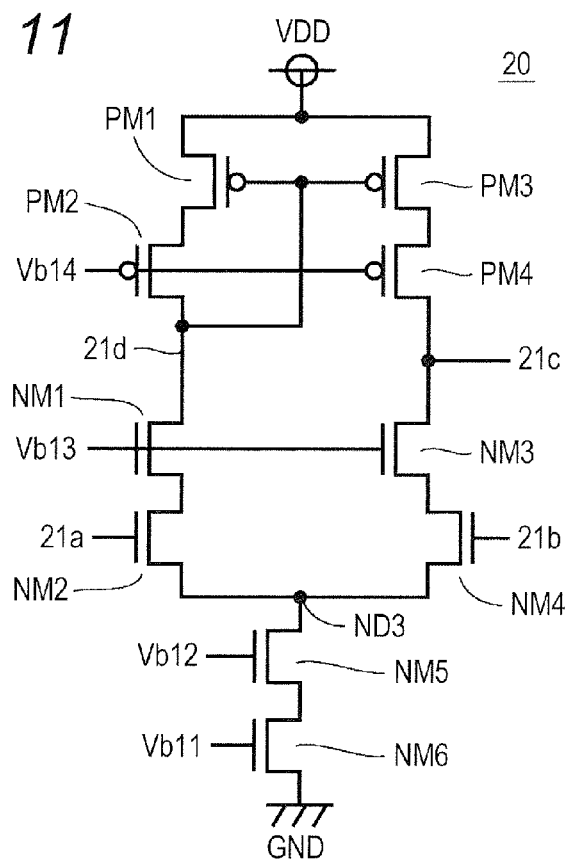
FIG. 11 is a circuit diagram illustrating one example of a configuration of an operational amplifier 20 in FIG. 10.

FIG. 11 is a circuit diagram illustrating one example of a configuration of the operational amplifier 20 in FIG. 10. The circuit in FIG. 11 is of the type called a telescopic operational amplifier.

When FIG. 11 is referred to, the operational amplifier 20 includes PMOS transistors PM1 to PM4, NMOS transistors NM1 to NM6 and so forth. The PMOS transistors PM1 and PM2 and the NMOS transistors NM1 and NM2 are serially coupled between the power source mode (the power source potential VDD) and a node ND3 in this order. Likewise, the PMOS transistors PM3 and PM4 and the NMOS transistors NM3 and NM4 are serially coupled between the power source node (the power source potential VDD) and the node ND3 in this order and are coupled in parallel with the entire of the transistors PM1, PM2, NM1 and NM2. The NMOS transistors NM5 and NM6 are serially coupled between the node ND3 and the ground node (the ground potential GND).

The bias voltages Vb12 and Vb11 are respectively supplied to gates of the NMOS transistors NM5 and NM6 and thereby the NMOS transistors NM5 and NM6 operate as the constant current sources.

The NMOS transistors NM2 and NM4 are used as an input transistor pair (a differential paired transistor). That is, a gate of the NMOS transistor NM2 corresponds to the positive input terminal 21a and a gate of the NMOS transistor NM4 corresponds to the negative input terminal 21b. The bias voltage Vb13 is supplied to gates of the NMOS transistors NM1 and NM3. Thereby, the NMOS transistors NM1 to NM4 configure a cascode differential amplification circuit.

The bias voltage Vb14 is supplied to gates of the PMOS transistors PM2 and PM4 and gates of the PMOS transistors PM1 and PM3 are coupled to a drain (a node 21d) of the PMOS transistor PM2. Thereby, the PMOS transistors PM1 to PM4 configure the low-voltage cascode current mirror and are used as load transistors of the cascode differential amplification circuit. A drain of the PMOS transistor PM4 corresponds to the output terminal 21c.

Figure 12:
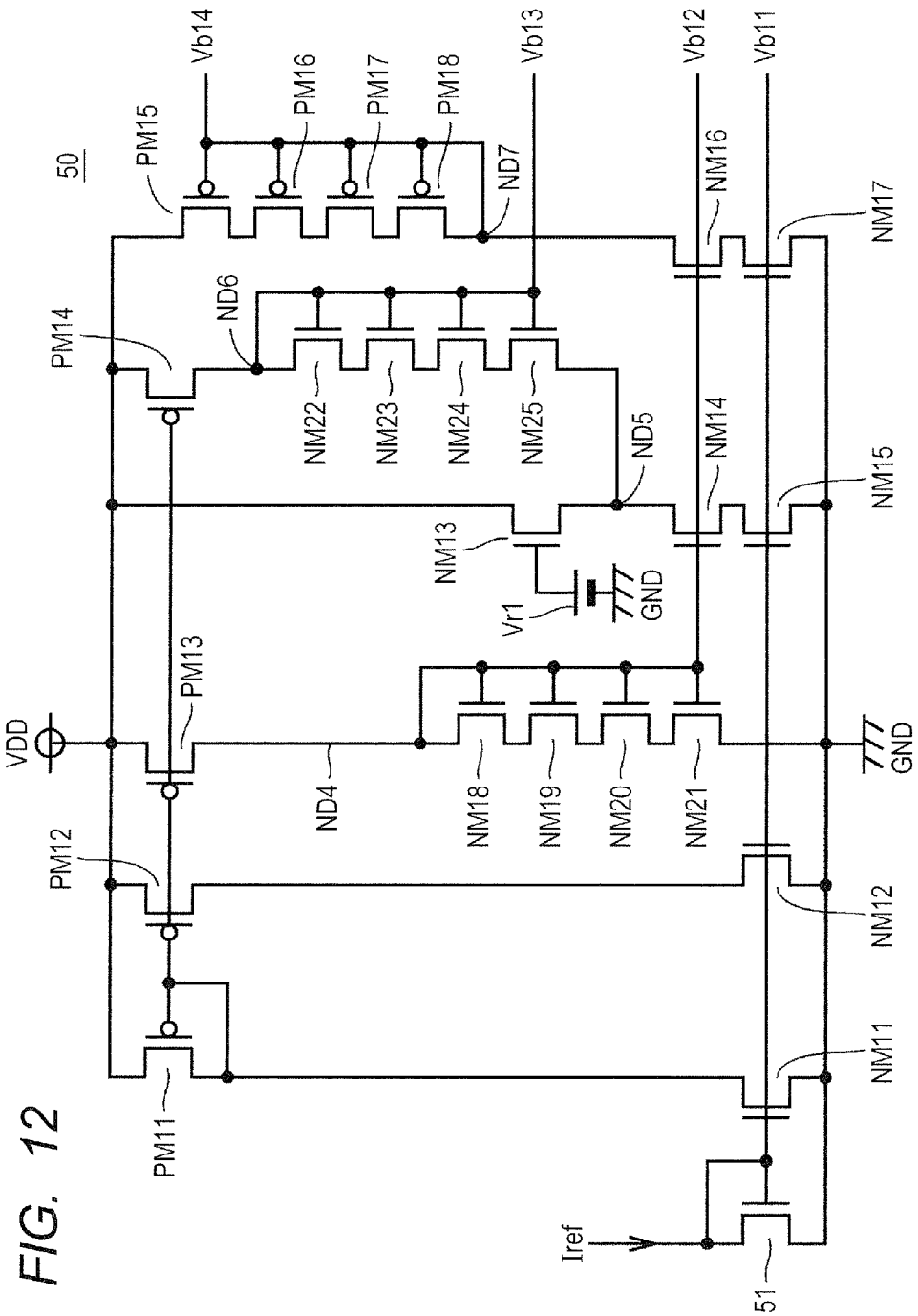
FIG. 12 is a diagram illustrating one example of a configuration of a circuit which generates bias voltages Vb11 to Vb14 to be supplied to the PGA 12 in FIG. 11.

FIG. 12 is a diagram illustrating one example of a circuit for generating the bias voltages Vb11 to Vb14 to be supplied to the PGA 12 in FIG. 11. The circuit in FIG. 12 is provided in each bias circuit 50. When FIG. 12 is referred to, the bias circuit 50 includes PMOS transistors PM11 to PM18, NMOS transistors NM11 to NM25 and so forth.

The NMOS transistors NM11, NM12, NM15 and NM17 configure the current mirror together with the diode-coupled NMOS transistor 51 into which the reference current Iref from the current source circuit 80 flows. A gate voltage of the NMOS transistor 51 is output as the bias voltage Vb11.

The PMOS transistor PM11 is diode-coupled and serially coupled with the NMOS transistor NM11. The PMOS transistors PM12 to PM14 configure the current mirror together with the PMOS transistor PM11.

The PMOS transistor PM13 and the NMOS transistors NM18 to NM21 are serially coupled between the power source node (the power source potential VDD) and the ground node (the ground potential GND). Gates of the NMOS transistors NM18 to NM21 are coupled with a drain (a node ND4) of the NMOS transistor NM18. Thereby, the NMOS transistors NM18 to NM21 are used as the load transistors, the reference current Iref or a current which is proportional to the reference current Iref flows into the load transistors NM18 to NM21 and thereby a voltage generated at the node ND4 is output as the bias voltage Vb12.

The NMOS transistors NM13 to NM15 are serially coupled between the power source node (the power source potential VDD) and the ground node (the ground potential GND). A reference voltage Vr1 is applied to a gate of the NMOS transistor NM13 and thereby the NMOS transistor NBM13 is used as a current source which flows out a current according to the reference voltage Vr1. The bias voltage Vb12 is applied to a gate of the NMOS transistor NM14.

The PMOS transistor 14 and the NMOS transistors NM22 to NM25 are serially coupled between the power source node (the power source potential VDD) and a source (a node ND5) of the NMOS transistor NM13. Gates of the NMOS transistors NM22 to NM25 are coupled to a drain (a node ND6) of the NMOS transistor 22. The NMOS transistors NM18 to NM21 are used as the load transistors and a voltage generated at the node ND6 is output as the bias voltage Vb13.

The PMOS transistors PM15 to PM18 and the NMOS transistors NM16 and NM17 are serially coupled between the power source node (the power source potential VDD) and the ground node (the ground potential GND). The bias voltage Vb12 is applied to a gate of the NMOS transistor NM16. Gates of the PMOS transistors PM15 to PM18 are coupled with a drain (a node ND7) of the PMOS transistor PM18. The PMOS transistors PM15 to PM18 are used as the load transistors, the reference current Iref or a current which is proportional to the reference current Iref flows into the load transistors and thereby a voltage generated at the node ND7 is output as the bias voltage Vb14.

[Configurational Example of ADC and Supply of Bias Voltages]

Each bias circuit 50 further generates the bias voltage to be supplied to the ADC 13 in the corresponding column circuit 10. Thereby, it is also possible to reduce the position dependency of the circuit characteristics of the ADC 13. In the following, description will be specifically made with reference to the drawings.

Figure 13:
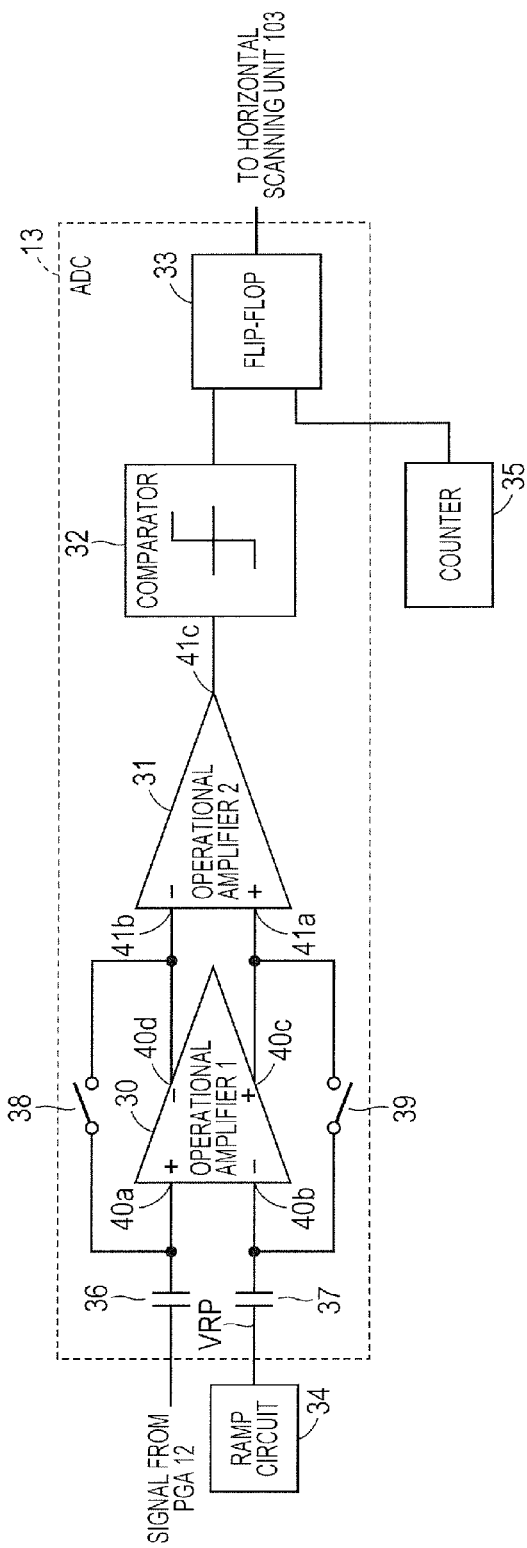
FIG. 13 is a circuit diagram illustrating one example of a configuration of an ADC 13 FIG. 4.

FIG. 13 is a circuit diagram illustrating one example of a configuration of the ADC 13 in FIG. 4. When FIG. 13 is referred to, the ADC 13 includes capacitances 36 and 37, operational amplifiers 30 and 31, switches 38 and 39, a comparator 32, a flip-flop 33 and so forth.

A signal sent from the PGA 12 is input into a positive input terminal 40a of the operational amplifier 30 via the capacitance 36. A ramp signal VRP sent from a ramp circuit 34 is input into a negative input terminal 40b of the operational amplifier 30 via the capacitance 37. The ramp signal VRP has a voltage which is swept at a constant incline. The positive input terminal 40a and a negative output terminal 40d of the operational amplifier 30 are coupled together via the switch 38. The negative input terminal 40b and a positive output terminal 40c of the operational amplifier 30 are coupled together via the switch 39. The positive output terminal 40c of the operational amplifier 30 is coupled to a positive input terminal 41a of the operational amplifier 31. The negative output terminal 40d of the operational amplifier 30 is coupled to a negative output terminal 41b of the operational amplifier 31. An output terminal 41c of the operational amplifier 31 is coupled to the flip-flop 33 via the comparator 32. The comparator 32 is, for example, a CMOS inverter and so forth. Further, a value of a counter 35 is input into the flip-flop 33.

First, the switches 38 and 39 are turned off and thereby offset of the operational amplifier 30 is removed. After the offset has been removed, the switches 38 and 39 are turned on, and thereby sweeping of the ramp signal VRP is started and counting-up by the counter 35 is also started. When a signal level of the ramp signal VRP has exceeded a signal level of the signal sent from the PGA 12, a logical level of an output from the comparator 32 is inverted. A value counted by the counter 35 at that time is held as an AD conversion value in the flip-flop 33. The AD conversion values which have been counted by the counter 35 and held in the flip-flop 33 in this way are sequentially read out by the horizontal scanning unit 103 in FIG. 1.

Figure 14:
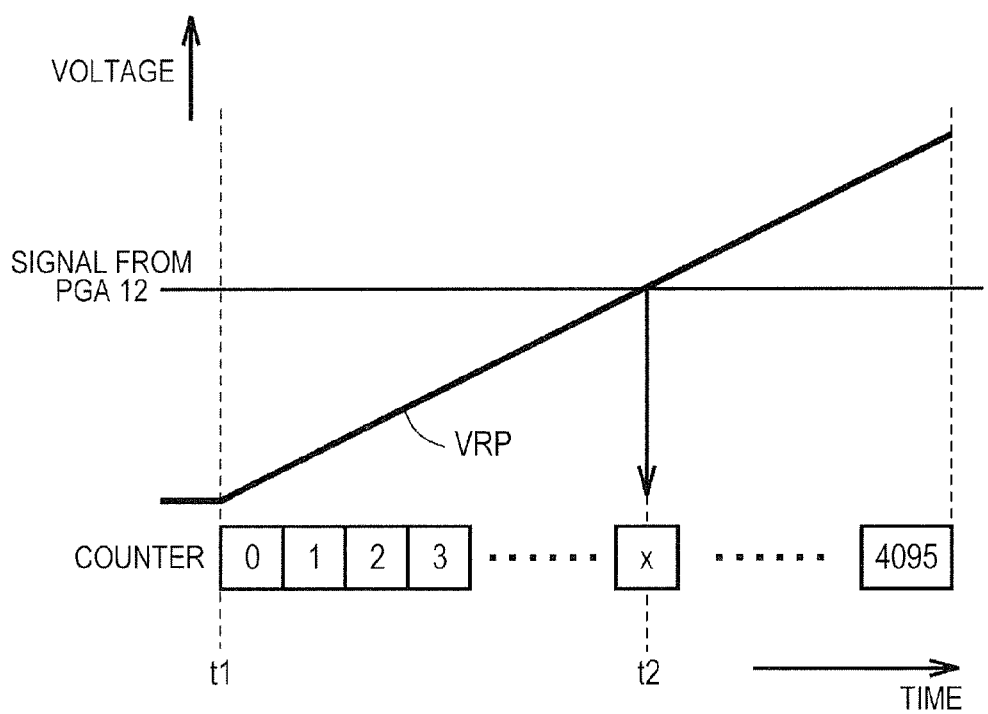
FIG. 14 is a timing chart illustrating one example of an operation of the ADC 13 in FIG. 13.

FIG. 14 is a timing chart illustrating one example of an operation of the ADC 13 in FIG. 13. When FIG. 14 is referred to, at a time t1, sweeping of the ramp signal VRP is started and counting-up by the counter 35 is also started. At a time t2, the signal level of the ramp signal VRP exceeds the signal level of the signal from the PGA 12. A value x counted by the counter 35 at that time is held in the flip-flop 33 in FIG. 13.

Figure 15:
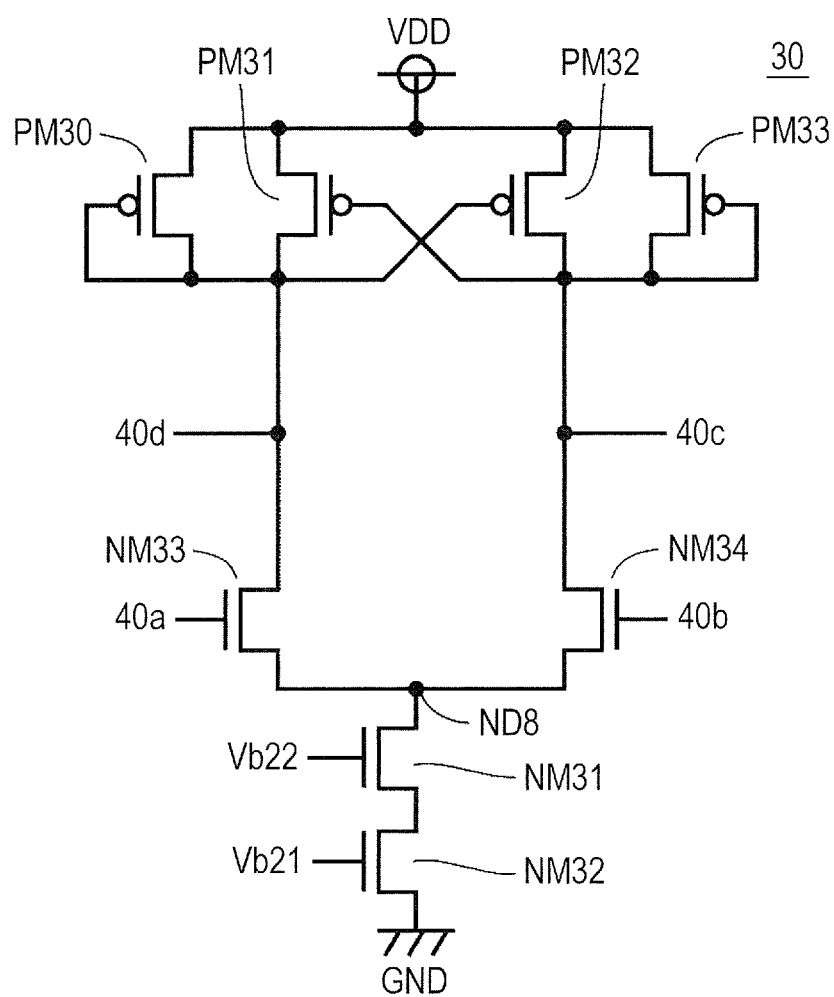
FIG. 15 is a circuit diagram illustrating one example of a configuration of an operational amplifier 30 in FIG. 13.

FIG. 15 is a circuit diagram illustrating one example of a configuration of the operational amplifier 30 in FIG. 13. When FIG. 15 is referred to, the operational amplifier 30 includes PMOS transistors PM30 to PM33, NMOS transistors NM31 to NM34 and so forth.

The PMOS transistor PM31 and the NMOS transistor NM33 are serially coupled between the power source node (the power source potential VDD) and a node ND8 in this order. The PMOS transistor PM32 and the NMOS transistor NM34 are serially coupled between the power source node (the power source potential VDD) and the node ND8 in this order and coupled in parallel with the entire of the transistors PM31 and NM33. The NMOS transistors NM31 and NM32 are serially coupled between the node ND8 and the ground node (the ground potential GND).

Bias voltages Vb22 and Vb21 are respectively input into gates of the NMOS transistors NM31 and NM32 and thereby the NMOS transistors NM31 and NM32 operate as the constant current sources.

The NMOS transistors NM33 and NM34 are used as the input transistor pair (the differential paired transistor). That is, a gate of the NMOS transistor NM33 corresponds to the positive input terminal 40a and a gate of the MNOS transistor 34 corresponds to the negative input terminal 40b.

The PMOS transistors PM31 and PM32 are cross-coupled type load transistors that gates and drains are crossly coupled. The PMOS transistors PM30 and PM 33 are diode-coupled respectively in parallel with the PMOS transistors PM31 and PM32. The drain of the PMOS transistor PM 32 corresponds to the positive output terminal 40c and the drain of the PMOS transistor PM 31 corresponds to the negative output terminal 40b.

As the operational amplifier in FIG. 13, it is possible to use the telescopic operational amplifier which has been described with reference to FIG. 11. It is possible to generate the bias voltages Vb21 and Vb22 to be supplied to the operational amplifier 30 by using a circuit which is the same as the circuit for generating the bias voltages Vb11 and Vb12 which has been described with reference to FIG. 12. In addition, when the telescopic operational amplifier which has been described with reference to FIG. 11 is to be used as the operational amplifier 31 in FIG. 13, it is possible to use the circuit which has been described with reference to FIG. 12 as the circuit for generating the bias voltages Vb11, Vb12, Vb13 and Vb14 to be supplied to the PGA 12.

Advantageous Effects

As described above, according to the CMOS image sensor of the first embodiment, the bias circuits 50[0] to 50[L] which generate the bias voltages to be supplied to the column circuits 10[0] to 10[N] are dispersedly arranged in the arrangement region of the column circuits 10. Thereby, since it is possible to suppress the influence of the potential distribution of the ground wire on the read-out current caused by the IR drops, it is possible to suppress the luminance unevenness (shading) of the picked-up image.

Further, also the bias voltages to be supplied to the PGA 12 and the ADC 13 which are provided in each column circuit 10 are supplied from each corresponding bias circuit 50. Thereby, it is possible to reduce the position dependency of the circuit characteristics of the PGA 12 and the ADC 13.

Second Embodiment

Configuration of Bias Circuit

In a CMOS image sensor according to the second embodiment, only one PMOS transistor 84 used as the constant current source (that is, only the PMOS transistor 84 [0]) is provided in the current source circuit 80 which has been described with reference to FIG. 7. In the L+1 bias circuits 50[0] to 50[L] which have been described with reference to FIG. 5 and FIG. 6, each of the L bias circuits 50[0] to 50[L−1] is configured to further include the current mirror circuit so as to generate and output the new reference current Iref by copying the input reference current Iref in accordance with the mirror ratio (1, in general). In this case, the 0-th bias circuit 50[0] accepts supply of the reference current Iref from the current source circuit 80. The i-th (wherein, 1≤i≤L) bias circuit 50[i] accepts supply of the reference current Iref from the i−1st bias circuit 50[i−1]. That is, the reference current Iref is sequentially transferred to the bias circuits 50[0], 50[1], . . . and 50[L] in this order. In the following, description will be specifically made with reference to the drawings.

Figure 16:
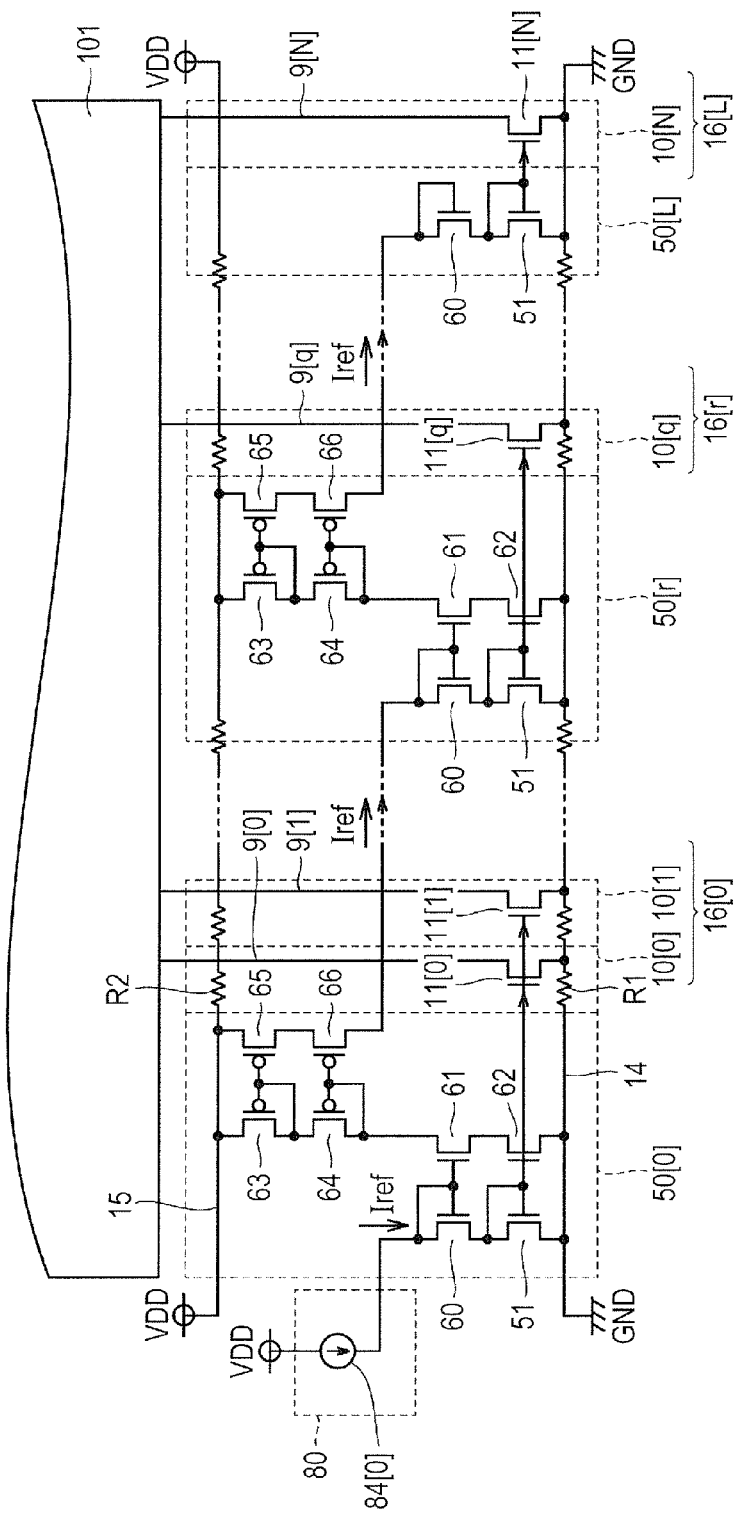
FIG. 16 is a circuit diagram illustrating one example of a configuration of the bias circuit 50 in a CMOS image sensor according to a second embodiment.

FIG. 16 is a circuit diagram illustrating one example of a configuration of the bias circuit 50 in the CMOS image sensor according to the second embodiment. When FIG. 16 is referred to, each of the bias circuits 50[0] to 50[L−1] includes NMOS transistors 51 and 60 to 62 and PMOS transistors 63 to 66.

The NMOS transistors 51 and 60 are diode-coupled transistors. A source of the NMOS transistor 51 is coupled to the ground wire 14 and a drain of the NMOS transistor 51 is coupled with a source of the NMOS transistor 60. The reference current Iref is input into a drain of the NMOS transistor 60. Gates of the NMOS transistors 61 and 62 are respectively coupled with gates of the NMOS transistors 60 and 51 and thereby the NMOS transistors 51 and 60 to 62 configure the cascode current mirror.

The PMOS transistors 63 and 64 are diode-coupled transistors and are serially coupled between the power source wire 15 and the ground wire 14 together with the NMOS transistors 61 and 62 in this array order. Thereby, the reference current Iref which has been copied to the NMOS transistors 61 and 62 also flows into the PMOS transistors 63 and 64. Gates of the PMOS transistors 63 and 64 are respectively coupled to gates of the PMOS transistors 65 and 66 and thereby the PMOS transistors 63 to 66 configure the cascode current mirror. Consequently, the copied reference current Iref is input into the bias circuit 50 the turn of which comes around from a drain of the PMOS transistor 66.

The bias circuit 50[L] includes the NMOS transistors 51 and 60 which have been mutually diode-coupled in order to receive the reference current Iref from the bias circuit 50[L−1].

A gate of the NMOS transistor 51 of each of the bias circuits 50[0] to 50[L] is coupled with a gate of the constant current transistor 11 provided in each column circuit 10 in the corresponding group 16. Thereby, the reference current Iref flows to each constant current transistor 11. Since the second embodiment is the same as the first embodiment in other points, repetitive description thereof is omitted. Incidentally, a general current mirror that transistors are not cascode-coupled may be used and also the low-voltage cascode current mirror may be used in place of the cascode current mirror.

Advantageous Effects

As described above, according to the CMOS image sensor of the second embodiment, it is possible to reduce the number of wirings for the reference current Iref to be supplied from the current source circuit 80 to the bias circuit 50 from L to one in comparison with the case of the first embodiment. Accordingly, it is possible to promote area reduction of the circuit.

Third Embodiment

Figure 17:
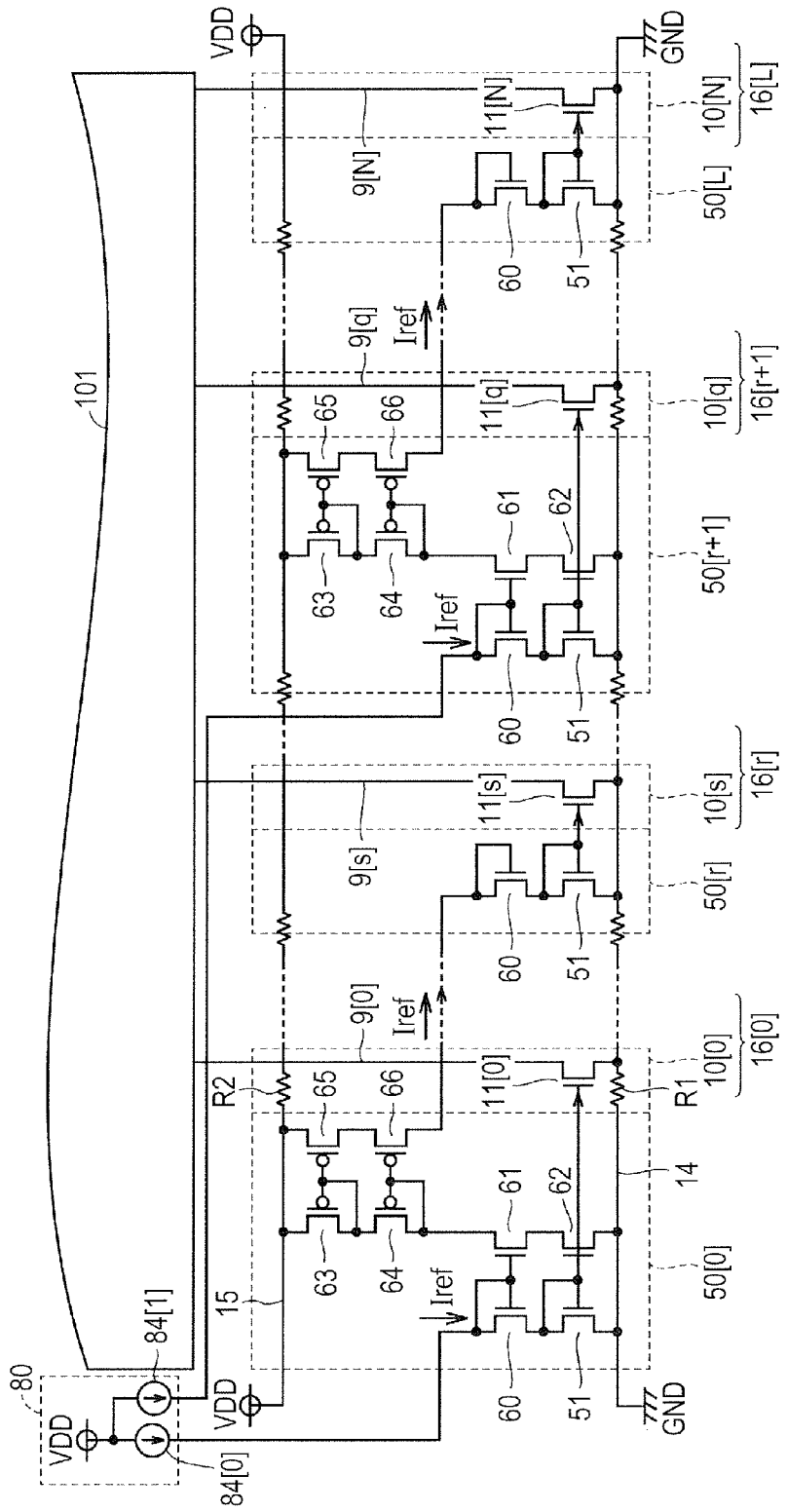
FIG. 17 is a circuit diagram illustrating one example of configurations of the current source circuit 80 and the bias circuit 50 of a CMOS image sensor according to a third embodiment.

FIG. 17 is a circuit diagram illustrating one example of configurations of the current source circuit 80 and the bias circuit 50 in a CMOS image sensor according to the third embodiment. The circuit diagram in FIG. 17 corresponds to those in FIG. 8A and FIG. 16.

In the current source circuit 80 in FIG. 17, two PMOS transistors 84 (that is, the PMOS transistors 84[0] and 84[1]) used as the constant current sources are provided. A drain of the PMOS transistor 84[0] is coupled with the bias circuit 50[0] and a drain of the PMOS transistor 84 [1] is coupled with the bias circuit 50[r+1]. Thereby, the reference current Iref is supplied from the current source circuit 80 to the bias circuits 50[0] and 50[r+1].

The reference current Iref which has been supplied to the bias circuit 50[0] is sequentially transferred to the bias circuits 50[1], 50[2], . . . and 50[r] in this order. The reference current Iref which has been supplied to the bias circuit 50[r+1] is sequentially transferred to the bias circuits 50[r+2], . . . and 50[L] in this order. For this purpose, each of the bias circuits 50[1] to 50[r−1] and 50[r+1] to 50[L] includes the cascode current mirror circuit configured by the NMOS transistors 51 and 60 to 62 and the cascode current mirror circuit configured by the PMOS transistors 63 to 66 as described with reference to FIG. 16. The general current mirror that the transistors are not cascode-coupled may be used and also the low-voltage cascode current mirror may be used in place of the cascode current mirror circuit. Incidentally, each of the bias circuit 50[r] and 50[L] includes only the NMOS transistors 51 and 60 which are diode-coupled in order to receive the reference current Iref and it is not necessary for each of the bias circuits 50[r] and 50[L] to include the mirror circuit.

It is possible to optionally combine the first embodiment with the second embodiment in this way. More generally, the current source circuit 80 generates and outputs the plurality of reference currents Iref. The bias circuits 50[0] to 50[L] include the plurality of first bias circuits and the plurality of second bias circuits. Each of the first bias circuits includes the current mirror circuit so as to copy the reference current Iref which has been input into it in accordance with the mirror ratio and thereby to generate and output a new reference current Iref. The plurality of the specific first bias circuits which are some of the plurality of first bias circuits accept input of the reference currents Iref from the current source circuit 80. Each of the remaining first bias circuits other than one or the plurality of specific first bias circuit(s) accepts input of the reference current Iref from another first bias circuit other than itself. Each of the second bias circuits accepts input of the reference current Iref from any of the plurality of first bias circuits.

Also the CMOS image sensor according to the third embodiment 301 has almost the same advantageous effects as those of the CMOS image sensor according to the first embodiment.

Fourth Embodiment

Figure 18:
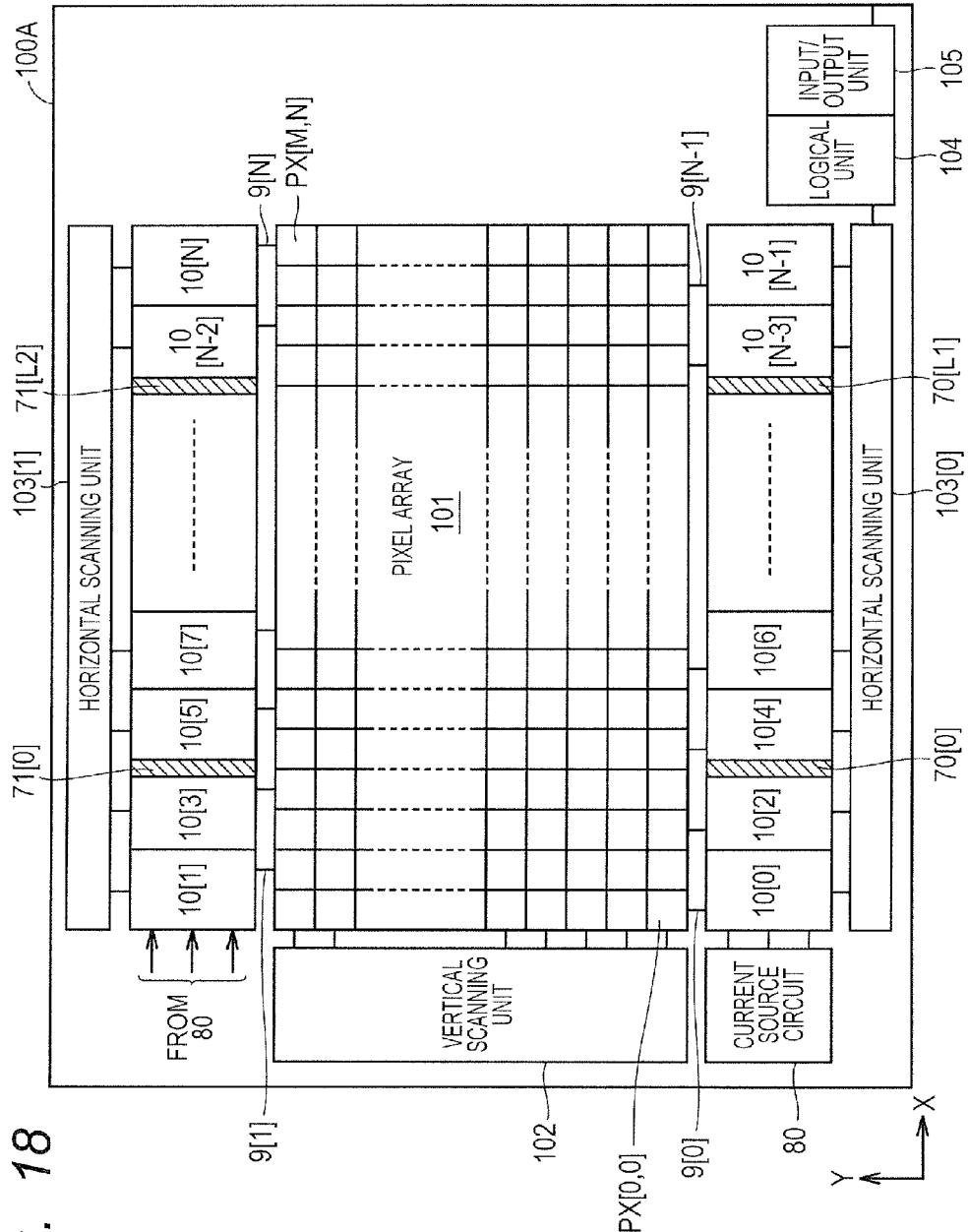
FIG. 18 is a block diagram illustrating one example of a configuration of a CMOS image sensor according to a fourth embodiment.

FIG. 18 is a block diagram illustrating one example of a configuration of a CMOS image sensor according to the fourth embodiment. The block diagram in FIG. 18 corresponds to the block diagram in FIG. 1.

In a CMOS image sensor 100A in FIG. 18, the column circuits 10[0], 10[2], . . . , 10[N−3] and 10[N−1] corresponding to the even numbered columns of the pixel array 101 are arrayed in the row direction (the X direction) along the lower side of the pixel array 101. The column circuits 10[1], 10[3], . . . , 10[N−2] and 10[N] corresponding to the odd-numbered columns of the pixel array 101 are arrayed in the row direction (the X direction) along an upper side of the pixel array 101. A horizontal scanning unit 103 [0] is provided to be used for the column circuits 10 which are arrayed along the lower side of the pixel array 101 and a horizontal scanning unit 103 [1] is provided to be used for the column circuits 10 which are arrayed along the upper side of the pixel array 101. Since it is possible to double the width of each column circuit 10 by arranging the column circuits 10 along the upper and lower sides of the pixel array 101 as in FIG. 18, there is such an advantageous effect that the degree of freedom in design is increased.

In the above-mentioned case, bias circuits 70[0] to 70[L1] for supplying the bias voltages to the column circuits 10[0], 10[2], . . . , 10[N−3] and 10[N−1] which are arrayed along the lower side of the pixel array 101 are provided. The bias circuits 70[0] to 70[L1] are dispersedly arranged in the region where the column circuits 10[0], 10[2], . . . , 10[N−3] and 10[N−1] are arrayed. That is, each of the bias circuits 70 is arranged between the two adjacent column circuits 10 or on the end side of the array of the plurality of column circuits 10.

Likewise, bias circuits 71[0] to 71[L2] for supplying the bias voltages to the column circuits 10[1], 10[3], . . . , 10[N−2] and 10[N] which are arrayed along the upper side of the pixel array 101 are provided. The bias circuits 71[0] to 71[L2] are dispersedly arranged in the region where the column circuits 10[1], 10[3], . . . , 10[N−2] and 10[N] are arrayed. That is, each of the bias circuits 71 is arranged between the two adjacent column circuits 10 or on the end side of the array of the column circuits 10.

Since the specific configurations of the bias circuits 70 and 71 are the same as those of the bias circuit 50 which have been described in the first to third embodiments, repetitive description thereof is omitted. In addition, the configuration in FIG. 18 is the same as that in FIG. 1 in other points, repetitive description thereof is omitted. It is possible to attain almost the same advantageous effects as the first embodiment in FIG. 1 also by the CMOS image sensor 100A which is configured as illustrated in FIG. 18.

In the foregoing, the invention which has been made by the inventors and others of the present invention has been specifically described on the basis of the preferred embodiments. However, it goes without saying that the present invention is not limited to the above-mentioned embodiments and may be altered and modified in a variety of ways within the scope not deviating from the gist of the present invention.

What is claimed is:
1. A solid-state image pickup device, comprising:
a pixel array in which a plurality of pixels, each of which is adapted to convert an optical signal to an electric signal, are arranged in a matrix;
a plurality of vertical signal lines provided respectively corresponding to columns of the pixel array;
a plurality of column circuits which are respectively coupled to the vertical signal lines and each of which fetches the electric signal which has been output from each pixel in the corresponding column, the column circuits being divided into a plurality of groups, each group of column circuits comprising at least two column circuits;
a plurality of bias circuits respectively corresponding to a preselected group of the groups of column circuits; and
a current source circuit which provides a reference current to each bias circuit of the plurality of bias circuits,
wherein each bias circuit of the plurality of bias circuits is configured to form a part of a current mirror circuit that receives a reference current from the current source circuit and is configured so as to generate one bias voltage or a plurality of bias voltages on a basis of the reference current and to supply the generated one bias voltage or bias voltages to each of the column circuits belonging to a group corresponding to that bias circuit,
wherein each of the bias circuits is provided adjacent to one of the column circuits belonging to the corresponding group, and
wherein the current source circuit comprises:
a plurality of transistors configured as a current mirror;
a comparator with an output voltage that controls the current mirror;
a band-gap reference circuit to provide a reference voltage into a first input terminal of the comparator; and
a plurality of serially-connected resistive elements to provide a feedback voltage into a second input terminal of the comparator.

2. The solid-state image pickup device according to claim 1,
wherein each of the column circuits includes a first transistor, one main electrode of which is coupled to the corresponding vertical signal line,
wherein each of the bias circuits includes a second transistor, one main electrode of which receives the reference current or a current which is proportional to the reference current, and
wherein the second transistor configures a current mirror together with the first transistor in each of the corresponding column circuits in the group corresponding to that bias circuit.

3. The solid-state image pickup device according to claim 2,
wherein each of the bias circuits includes one load transistor or a plurality of load transistors into which the reference current or a current which is proportional to reference current flows, and voltage(s) generated in the one load transistor or the load transistors is/are supplied to the corresponding column circuit as the bias voltage(s).

4. The solid-state image pickup device according to claim 3,
wherein each of the column circuits further includes a programmable gain amplifier which amplifies the electric signal output from each of the pixels in the corresponding column of the pixel array, and
wherein the programmable gain amplifier receives one bias voltage or a plurality of bias voltages from the corresponding bias circuit.

5. The solid-state image pickup device according to claim 4,
wherein each of the column circuits further includes an analog-to-digital converter which converts the electric signal which has been amplified by the programmable gain amplifier into a digital signal, and wherein the analog-to-digital converter receives one bias voltage or a plurality of bias voltages from the corresponding bias circuit.

6. The solid-state image pickup device according to claim 4, wherein the programmable gain amplifier comprises:
an operational amplifier having a reference voltage provided to a first input terminal;
an input capacitor coupled between a second input terminal and a corresponding vertical line; and
a feedback capacitor coupled between the second input terminal and an output terminal.

7. The solid-state image pickup device according to claim 1,
wherein the column circuits are arrayed along a first row-direction side of the pixel array, and
wherein each of the bias circuit is arranged between the adjacent two column circuits or on an end side of an array of the column circuits.

8. The solid-state image pickup device according to claim 7,
wherein a width of each column of the pixel array is larger than an array-direction width of each of the column circuits.

9. The solid-state image pickup device according to claim 1,
wherein, in the column circuits, a plurality of first column circuits corresponding to even-numbered columns of the pixel array are arrayed along a first row-direction side of the pixel array,
wherein, in the column circuits, a plurality of second column circuits corresponding to odd-numbered columns of the pixel array are arrayed along a second side of the pixel array which faces the first side,
wherein one bias circuit or each of the bias circuits which supplies the bias voltages to the first column circuits is arranged between the two adjacent first column circuits or on an end side of an array of the first column circuits, and
wherein one bias circuit or each of the bias circuits which supplies the bias voltages to the second column circuits is arranged between the two adjacent second column circuits or on an end side of an array of the second column circuits.

10. The solid-state image pickup device according to claim 1, wherein each bias circuit receives a same value of reference current.

11. The solid-state image pickup device according to claim 1, wherein each column circuit includes a constant current transistor that maintains a constant current source for its associated vertical signal line, and
wherein each group of the plurality of groups is determined by having the bias circuit that is provided adjacent to one of the column circuits belonging to the group to define a current mirror with each constant current transistor.

12. The solid-state image pickup device according to claim 1, further comprising:
the current source circuit which generates and provides the reference current to each bias circuit of the plurality of bias circuits,
wherein, as the bias circuits, L+1 bias circuits, numbered from a 0-th bias circuit to an L-th bias circuit (L is an integer of 2 or more), are provided,
wherein each of L bias circuits numbered from the 0-th bias circuit to an L−1st bias circuit includes a current mirror circuit and generates and outputs a new reference current by copying the reference current which has been input in accordance with a mirror ratio,
wherein the 0-th bias circuit accepts input of the reference current from the current source circuit, and
wherein an i-th ($1 \le i \le L$) bias circuit accepts input of the reference current from an i−1st bias circuit.

13. The solid-state image pickup device according to claim 1,
wherein the bias circuits include:
a plurality of first bias circuits, each of which includes a current mirror circuit and generates and outputs a new reference current by copying the reference current which has been input in accordance with a mirror ratio; and
a plurality of second bias circuits,
wherein each of specific first bias circuits which are part of the first bias circuits accepts input of the reference current from the current source circuit,
wherein each of the remaining first bias circuit other than the specific first bias circuits accept a reference current input from one of the specific first bias circuits, and
wherein each of the second bias circuits accepts a reference current input from a predetermined one of the first bias circuits.

14. A solid-state image pickup device, comprising:
a pixel array in which a plurality of pixels, each of which is adapted to convert an optical signal to an electric signal, are arranged in a matrix;
a plurality of vertical signal lines provided respectively corresponding to columns of the pixel array;
a plurality of column circuits which are respectively coupled to the vertical signal lines and each of which fetches the electric signal which has been output from each pixel in the corresponding column, the column circuits being divided into a plurality of groups;
a plurality of bias circuits respectively corresponding to the groups of the column circuits; and
a current source circuit which provides the reference current to each bias circuit of the plurality of bias circuits;
wherein each of the bias circuits receives a reference current from the current source circuit, generates one bias voltage or a plurality of bias voltages on a basis of the reference current, and supplies the generated one bias voltage or bias voltages to each of the column circuits belonging to the corresponding group,
wherein each of the bias circuits is provided adjacent to one of the column circuits belonging to the corresponding group,
wherein, as the bias circuits, L+1 bias circuits, numbered from a 0-th bias circuit to an L-th bias circuit (L is an integer of 2 or more), are provided,
wherein each of L bias circuits numbered from the 0-th bias circuit to an L−1st bias circuit includes a current mirror circuit and generates and outputs a new reference current by copying the reference current which has been input in accordance with a mirror ratio,
wherein the 0-th bias circuit accepts input of the reference current from the current source circuit, and
wherein an i-th ($1 \le i \le L$) bias circuit accepts an input of the reference current from an i−1st bias circuit.

15. A solid-state image pickup device, comprising:
a pixel array in which a plurality of pixels, each of which is adapted to convert an optical signal to an electric signal, are arranged in a matrix;
a plurality of vertical signal lines provided respectively corresponding to columns of the pixel array;

a plurality of column circuits which are respectively coupled to the vertical signal lines and each of which fetches the electric signal which has been output from each pixel in the corresponding column, the column circuits being divided into a plurality of groups, each group of column circuits comprising at least two column circuits; and a plurality of bias circuits respectively corresponding to a preselected group of the groups of column circuits, wherein each bias circuit of the plurality of bias circuits is configured to form a part of a current mirror circuit that receives a reference current from a current source circuit and is configured so as to generate one bias voltage or a plurality of bias voltages on a basis of the reference current and to supply the generated one bias voltage or bias voltages to each of the column circuits belonging to a group corresponding to that bias circuit, wherein each of the bias circuits is provided adjacent to one of the column circuits belonging to the corresponding group, wherein the bias circuits include:

a plurality of first bias circuits, each of which includes a current mirror circuit and generates and outputs a new reference current by copying the reference current which has been input in accordance with a mirror ratio; and a plurality of second bias circuits, wherein each of specific first bias circuits which are part of the first bias circuits accepts an input of the reference current from the current source circuit, wherein each remaining first bias circuits, other than the specific first bias circuits, accepts a reference current input from a first bias circuit other than itself, and wherein each of the second bias circuits accepts an input of the reference current from a preselected one of the first bias circuits.

\* \* \* \* \*